United States Patent
Mahoney et al.

(10) Patent No.: US 10,645,588 B2
(45) Date of Patent: May 5, 2020

(54) SYSTEMS AND METHODS FOR COORDINATED ACCESS POINT CHANNEL ASSIGNMENT

(71) Applicant: CABLE TELEVISION LABORATORIES, INC., Louisville, CO (US)

(72) Inventors: Kevin Mahoney, Longmont, CO (US); John C. Bahr, Superior, CO (US); Neeharika Allanki, Mercer Island, VA (US); Mufaddal Makati, Broomfield, CO (US)

(73) Assignee: Cable Laboratories, Inc, Louisville, CO (US)

( * ) Notice: Subject to any disclaimer, the term of this patent is extended or adjusted under 35 U.S.C. 154(b) by 0 days.

(21) Appl. No.: 16/133,621

(22) Filed: Sep. 17, 2018

(65) Prior Publication Data

US 2019/0075469 A1    Mar. 7, 2019

Related U.S. Application Data

(63) Continuation-in-part of application No. 15/466,650, filed on Mar. 22, 2017, and a continuation-in-part of
(Continued)

(51) Int. Cl.
*H04W 16/12* (2009.01)
*H04B 17/318* (2015.01)
(Continued)

(52) U.S. Cl.
CPC .......... *H04W 16/12* (2013.01); *H04B 17/318* (2015.01); *H04W 24/02* (2013.01);
(Continued)

(58) Field of Classification Search
CPC ..... H04W 16/12; H04W 24/10; H04W 24/08; H04W 92/20; H04W 48/16; H04B 17/336
(Continued)

(56) References Cited

U.S. PATENT DOCUMENTS

2008/0096575 A1    4/2008 Aragon et al.
2010/0087149 A1*   4/2010 Srinivasan ............ H04W 16/08
                                                455/63.1
(Continued)

*Primary Examiner* — Faruk Hamza
*Assistant Examiner* — Jean F Voltaire
(74) *Attorney, Agent, or Firm* — Armstrong Teasdale, LLP

(57) ABSTRACT

A multiple access point system includes a wireless network including a first channel and a second channel. The system further includes a first access point and a second access point co-located within a single physical location environment, a wireless backhaul connecting the first and second access points to the wireless network, and a processor configured to (i) assign the first channel as a primary channel of the first access point and the second channel as a primary channel of the second access point, and (ii) assign the first channel as a secondary channel of the second access point and the second channel as a secondary channel of the second access point. The primary channel of the first access point does not overlap with the primary channel of the second access point, and the secondary channel of the second access point overlaps with the first access point.

19 Claims, 12 Drawing Sheets

Related U.S. Application Data application No. 15/874,383, filed on Jan. 18, 2018, and a continuation-in-part of application No. 15/878,337, filed on Jan. 23, 2018.

(60) Provisional application No. 62/311,687, filed on Mar. 22, 2016, provisional application No. 62/447,563, filed on Jan. 18, 2017, provisional application No. 62/459,467, filed on Feb. 15, 2017, provisional application No. 62/449,391, filed on Jan. 23, 2017, provisional application No. 62/558,933, filed on Sep. 15, 2017.

(51) Int. Cl.
| | | |
|---|---|---|
| *H04W 24/02* | (2009.01) | |
| *H04W 24/10* | (2009.01) | |
| *H04W 48/16* | (2009.01) | |
| *H04W 92/20* | (2009.01) | |
| *H04B 17/336* | (2015.01) | |
| *H04W 24/08* | (2009.01) | |
| *H04W 48/20* | (2009.01) | |

(52) U.S. Cl.
CPC .......... *H04B 17/336* (2015.01); *H04W 24/08* (2013.01); *H04W 24/10* (2013.01); *H04W 48/16* (2013.01); *H04W 48/20* (2013.01); *H04W 92/20* (2013.01)

(58) Field of Classification Search
USPC ........................................... 370/252
See application file for complete search history.

(56) References Cited

U.S. PATENT DOCUMENTS

| | | |
|---|---|---|
| 2014/0059218 A1 | 2/2014 | Ganu et al. |
| 2015/0085844 A1* | 3/2015 | Tian ............... H04W 48/16 370/338 |
| 2015/0219742 A1 | 8/2015 | Castagnoli et al. |
| 2015/0358830 A1 | 12/2015 | Bajko |
| 2016/0212745 A1* | 7/2016 | Hiertz ............ H04L 61/6022 |
| 2017/0034847 A1* | 2/2017 | He ................. H04W 74/06 |

* cited by examiner

SYSTEMS AND METHODS FOR COORDINATED ACCESS POINT CHANNEL ASSIGNMENT

RELATED APPLICATIONS

This application is a continuation-in-part of pending U.S. application Ser. No. 15/466,650, filed Mar. 22, 2017, which prior application claims priority to U.S. Provisional Application Ser. No. 62/311,687 filed Mar. 22, 2016. This application is also a continuation-in-part of pending U.S. application Ser. No. 15/874,383, filed Jan. 18, 2018, which second prior application claims priority to and the benefit of U.S. Provisional Application No. 62/447,563, filed Jan. 18, 2017, and U.S. Provisional Application No. 62/459,467, filed Feb. 15, 2017. This application is also a continuation-in-part of pending U.S. Application Ser. No. 15/878,337, filed Jan. 23, 2018, which third prior application claims priority to and the benefit of U.S Provisional Application No. 62/449,391 filed Jan. 23, 2017. This application also claims priority to and the benefit of U.S. Provisional Application Ser. No. 62/558,933 filed Sep. 15, 2017. The respective disclosures of all of these prior applications are incorporated by reference herein in their entireties.

FIELD

The present invention relates to coordinating access points (APs) used to facilitate network access, such as but not necessary limited to facilitating coordination among a plurality of APs in a wireless local area network of a home or other location where the plurality of APs cooperate to facilitate interfacing signaling with another network. The present invention further relates to steering clients between APs or other sources of wireless signaling, such as but not necessarily limited to supplanting or augmenting roaming capabilities of the clients with independent steering decisions made at the APs. The field of the invention further relates to coordinated access channel assignment using multiple wireless interfaces for a single AP.

BACKGROUND

Providing subscribers with reliable Wi-Fi coverage and capacity in a medium to large sized home, using a single Access Point (AP), can become challenging when the associated Wi-Fi users experience dead zones having little or no connectivity, such as at fringe areas in the home located at wireless signaling range limits of the AP and/or other areas receiving intermittent or insufficient wireless signals due to shielding, interferences or other influences. Operators are looking at multiple AP deployments in order to provide effective whole home coverage. In such scenarios, coordination between the APs in a home Extended Service Set (ESS) is required to effectively optimize many aspects of the network such optimal client association and radio resource optimization.

One contemplated solution to this problem includes deploying multiple APs at strategic positions throughout the home to coordinate their wireless service areas in a manner designed to provide wireless coverage sufficient to eliminate dead zones and/or to otherwise assure sufficient wireless service throughout the Wi-Fi network. The use of multiple APs within the home or other location can become problematic from at least a network optimization and performance standpoint due to an inability of the APs to coordinate client associations and radio resources, particularly when the wireless local area network (WLAN) is operated without assistance from or independently of a wireless local area network controller (WLC). One non-limiting aspect of the present invention contemplates ameliorating the network optimization and performance concerns by enabling coordination between APs, including but not limited to addressing network optimization and performance concerns associated with sticky clients, AP overloading, radio frequency (RF) interference, excessive AP switching ("ping-ponging"), etc.

In order to properly take advantage of an environment having multiple APs, clients, stations (STAs) or other subscriber devices being used to access the Wi-Fi network in such an environment may be required to switch between the access points, such as when moving beyond a desired signaling range of a connected to one of the APs, i.e., switch to another AP prior to reaching the dead zone or other poor performance limitation of the connected to one of the APs.

Clients may switch from one AP to another AP in a roaming operation where a client disassociates from one AP and associates with another AP. The capabilities of clients to instigate roaming decisions may allow clients to make decisions locally based on information, measurements, metrics and other data as seen from the client perspective, e.g., clients can look at available APs and decide the one they believe will most likely service its needs in a desired manner. One problem with roaming operations being implemented according to such client-based or client-centric decisions is that clients lack an overall view of the Wi-Fi environment, particularly when multiple APs may be coordinating to facilitate coverage for a home or other entity. The inability of clients to see an entirety of the Wi-Fi environment, and/or to appreciate activities of multiple APs and the clients connected thereto, can result in lower overall performance of the Wi-Fi network, especially when the clients make decisions that are best for them as opposed to those that are best for overall performance of the Wi-Fi network.

One non-limiting aspect of the present invention contemplates ameliorating the network degradations and inefficiencies associated with client-based or client-centric roaming decisions by supplanting or augmenting those decisions with a network-based or network-centric process for making decisions associated with clients switching from one AP to another.

In an enterprise environment the WLAN Controller (WLC) is an essential part of the network and manages the inter-AP communication and coordination in a vendor-proprietary manner. In a home network, however, where there is no WLC, there are also no standards or even defined best practices about how multiple APs in a home ESS should communicate with each other. Thus AP coordination suffers or is non-functional.

Existing coordination technologies could allow Wi-Fi APs in a home Extended Service Set (ESS) network to exchange information, ensuring clients are connected to the best AP for that client without adversely affecting other clients. While all vendors agree on the issues involved in AP Coordination, and some have implemented partial solutions, none have a complete solution. Standard 11v based client steering remains one of the main issues frustrating most vendors.

There is not a currently defined standard protocol that will solve the AP Coordination problem and there is value in defining a standard protocol or set of protocols that provide coordination of client associations and radio resources when multiple APs are deployed in a home.

Many Wi-Fi users' homes require more than one Wi-Fi AP for sufficient coverage. However, adding additional APs, which have been configured correctly and placed in an optimal location, can cause other wireless issues. For example, home ESS (Extended Service Set) networks can experience Wi-Fi client problems. One such client problem is a 'sticky' client or clients that do not roam optimally. Another client problem is where a client or clients unknowingly overload the serving AP even though there may be one or more underutilized APs in the vicinity. Due to the nature of Wi-Fi as a shared medium, these problems create a negative impact on the user experience of the other Wi-Fi clients on the network.

Home Wi-Fi users already expect to stream HD videos to multiple clients simultaneously from all areas of the house, and while moving around in the home, without interruptions. This has a high impact on the network in terms of the bandwidth consumed. Research also shows that Voice over Wi-Fi (VoWi-Fi) will be used extensively within the home networks due to the ubiquity and low cost of Wi-Fi. It is to be noted that, for optimal VoWi-Fi call quality, fast roaming, low latency and low jitter are important.

Conventional Wi-Fi solutions rely on the client to actively send periodic probe requests to nearby APs. This reliance on active participation from the client device(s) becomes problematic when the probe requests are sent infrequently and/or are sent on different channels.

SUMMARY OF THE INVENTION

The present invention is utilized in a multiple-AP home environment to alleviate AP overloading, sticky clients, and RF interference in a home network.

In the present invention, coordinated APs have a holistic view of the multiple AP network in which they exist, thereby allowing APs to can take action to eliminate client issues.

In an embodiment, APs are configured to coordinate with other APs to accomplish two categories of tasks: Client Link Management (CLM) and Radio Resource Management (RRM). CLM ensures that wireless clients are associated with an optimal AP, see below. RRM ensures that the wireless fronthaul that serves clients and backhaul between APs are both optimized. Optimized here may include but is not limited to avoiding RF interference while maintaining a high throughput fronthaul and backhaul, by changing one or more of channels, bands, channel widths, transmit power, etc.

In an embodiment, APs may perform certain measurements (e.g., MCS rate of client, missed packet counts, transmission errors, etc.) or they can request and/or receive information from 802.11k-capable client measurements (e.g., link measurement reports, station statistics report, transmit stream measurement report, channel load report). For example, APs may receive CLM Information, such as but not limited to AP to Gateway link quality metrics (e.g., throughput, jitter, latency), client association metrics (e.g., the number of associations, the number of disassociations, disassociation/deauthentication reason codes, etc.), current client link metrics (throughput, PER, RSSI, SINR, MCS), client capabilities (operating channels and bands, support for 802.11k/11v), channel utilization/load report per BSS, client band association history and desired band for one or more certain clients (e.g., wireless printers: 2.4 GHz, set-top boxes: 5 GHz), client handoff/steering history (e.g., does a client allow itself to be steered?), CLM relevant AP Information contained in 802.11k Neighbor Reports for ESS and non-ESS neighbors (channel, QoS capable, APSD capable, part of a mobility domain, throughput capabilities (HT/VHT AP), BSS Transition Management preferences, etc.), and Traffic Stream/Traffic Category Measurement Report (e.g., between AP and client—validate capability with steering target AP). In addition, APs may measure or receive RRM Information, such as AP capabilities (channels, bands, channel width, auto channel selection, supported transmit powers, 802.11h supported), current AP settings (current channel and extension channel(s), guard Interval, transmit power, 802.11h enabled, regulatory domain), AP observed noise floor per channel (for each AP—i.e., per location), and AP relative location (distance expressed as dB with respect to other APs).

In an embodiment, APs can share information either in a master/slave architecture or a peer-to-peer architecture. Such sharing of information may be event triggered. Such triggering events include but are not limited to Client Link Management Events, which include a client's MCS dropping below some threshold, a new client association, a client's QoS bandwidth requirement changes significantly (start/stop video stream, VoIP stream), an AP's medium utilization or client count load reaching a high threshold, and a periodic information sharing (e.g., every X minutes). Another triggering events include but are not limited to RRM Events, which include an AP's observed noise significantly increased (including OBSS traffic) triggering the need for a channel switch, the addition or removal of an AP, and one or more significant changes in traffic patterns.

In an embodiment, a multiple access point system includes a wireless network including a first channel and a second channel. The system further includes a first access point and a second access point co-located within a single physical location environment, a wireless backhaul connecting the first and second access points to the wireless network, and a processor configured to (i) assign the first channel as a primary channel of the first access point and the second channel as a primary channel of the second access point, and (ii) assign the first channel as a secondary channel of the second access point and the second channel as a secondary channel of the second access point. The primary channel of the first access point does not overlap with the primary channel of the second access point, and the secondary channel of the second access point overlaps with the first access point.

BRIEF DESCRIPTION OF THE INVENTION

These and other features, aspects, and advantages of the present disclosure will become better understood when the following detailed description is read with reference to the following accompanying drawings, in which like characters represent like parts throughout the drawings.

Figure 1A:
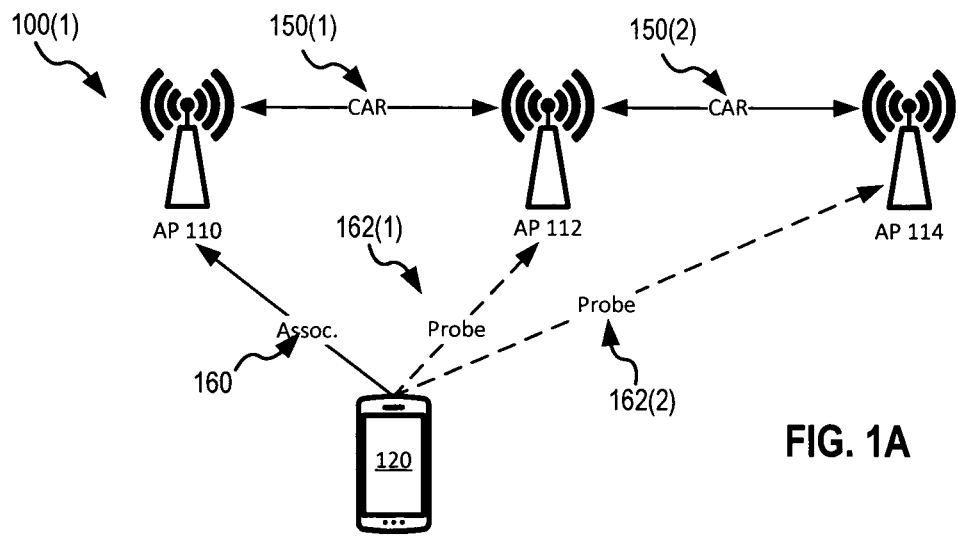
FIGS. 1A-1C show multi-AP system configured to steer a client between APs through AP coordination, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

There are current and emerging standards that specify information to be exchanged between APs and clients. This information allows clients to make better decisions about AP association, and provides information for APs to steer clients to better connections. Often there are clients in the home that do not support these standards. In such cases APs must force clients off an AP to steer them to other channels or bands. However, regardless of whether the clients have implemented these management standards, APs can better manage the network by coordinating efficient client handover and distribution among themselves. For example, a client's current AP can provide a recommendation to, or even force, the client to move to a different Basic Server Set (BSS)

based on data describing the AP's own load conditions as well as that of the other APs in the ESS.

In an enterprise environment, the WLAN Controller (WLC) is an essential part of the network and manages the inter-AP communication and coordination in a vendor-proprietary manner. In a home network, however, where there is no WLC, there are also no standards or even defined best practices about how multiple APs in a home ESS should communicate with each other. This is one problem the present invention solves. Other areas of network optimization (e.g., channel and TX power optimization) are also possible utilizing the present in-home AP-AP coordination.

Table 1, below, presents a list of network issues, trigger events, information shared between APs to assist in resolving the network issue (called herein a "Client Association Report" or "CAR" for short), and the AP coordinated decision.

same data" because, for example, a first AP may utilize a predictive algorithm to generate predictive data based on the shared data or new data has been generated since the last shared data distribution which will be shared in the next shared data distribution cycle. After distribution of the shared data it may be processed by either a shared algorithm such that consensus is substantially automatically generated through scheduled or periodic execution of that algorithm. Alternatively, consensus is each by cooperative and/or collaborative action by and between two or more of APs 110-114. Such cooperative or collaborative action requires inter AP communication for APs to reach consensus, one such exemplary system and process is described in FIGS. 1-4. Generically described, CARs 150(1), 150(2) include client 120 data, AP 110-114 data, and client-AP data for use in the coordinated client decision making processes described herein. Client data may include but is not limited

TABLE 1

| Network Issue | Trigger Event(s) | Information Shared between APs | AP Coordinated Decision |
| --- | --- | --- | --- |
| Sticky client on AP1 | AP1 sees client TX rate goes below a predetermined low limit AP1 registers a reduction in overall network throughput due to the sticky client consuming too much airtime | Client MAC address; Each AP's observed RSSI of the client; client capabilities; client handoff/steering history; request and response to move client to AP2 (BSS Transition Management | AP1 and AP2 reach consensus to move client to AP2 |
| Client #1 trying to join an overloaded AP1 when underutilized AP2 is also in range | Overloaded AP1 received ASSOC request from client | Client MAC address; Each APs' observed client RSSI; each AP's load (e.g., 802.11k Channel Load Report); client capabilities; client handoff/steering history; request and response to steer client to AP2 | AP1 and AP2 decide to steer client to associate to AP2 |
| AP1 is overloaded and some clients (e.g., #1 & #2) are within range of AP2 | AP1's number of associated clients is over predetermined limit, or that its channel load is over a predetermined value | Each of AP1's client MAC address; AP2's observed client RSSI - for each client on AP1; each AP's load (e.g., 802.11k Channel Load Report); client capabilities; client handoff/steering history; request and response to move a set of clients to AP2 | AP1 and AP2 decide to move clients #1 & #2 to AP2 |
| Roaming QoS client on AP2 attempting to join an overloaded AP1, AP3 has capacity and is in range | AP2 sees QoS client MCS rate going below some low limit | Client MAC address; client's QoS requirement (e.g., 802.11k Transmit Stream/Category Measurement Report or TSPEC submitted to AP1); Each AP's observed client RSSI; each AP's load (e.g., 802.1k Channel Load Report); client capabilities; client handoff/steering history; request and response to move client to AP3 | AP1, AP2, and AP3 decide QoS client should roam to AP3 instead of AP1 |
| AP3 experiencing interference on channel from neighbor AP | AP3 observed noise on current channel exceeds some limit, or a client on AP3 reports noise on channel above a certain limit | Each AP's or associated clients', observed Noise Histogram (e.g., 802.11k Noise Histogram Report) on current and other possible channels; all current ESS client channel capabilities; Neighbor report seen by each AP (e.g. 802.11k Neighbor Report); request and response to change channels | AP1 and AP3 decide to each change channels and AP2 decides to remain on the same channel |

Figure 1B:
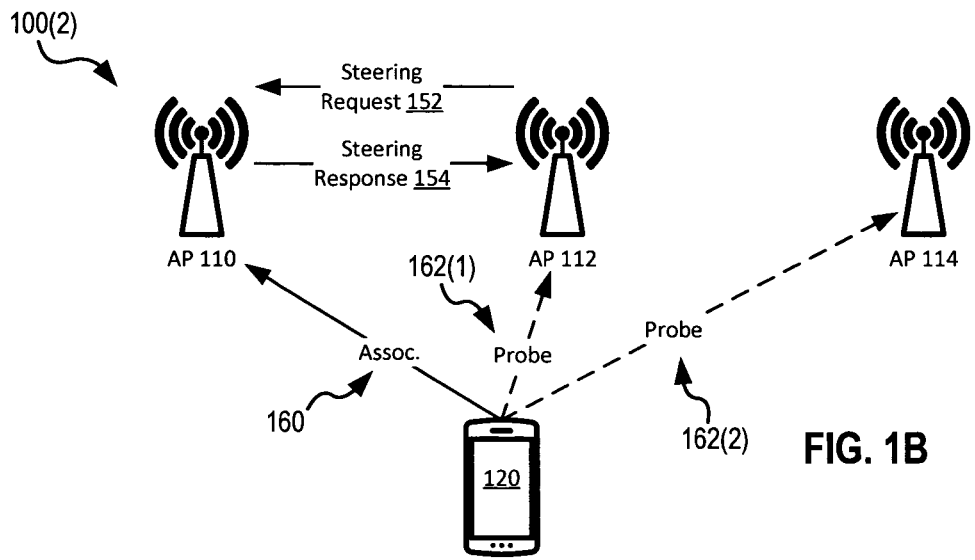
Figure 1C:
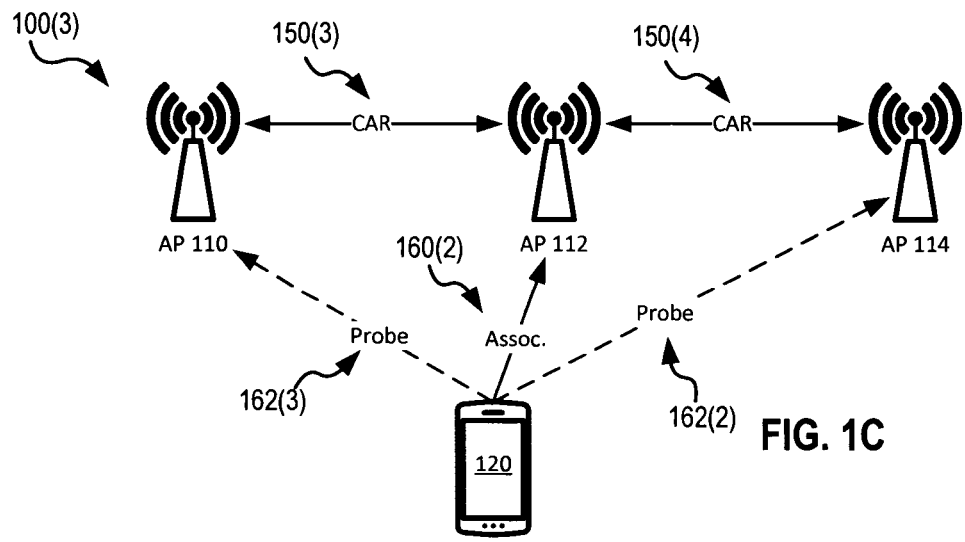

FIGS. 1A-1C show systems 100(1)-(3) configured to steer a client 120 between APs 110, 112, 114 through AP coordination.

Systems 100(1)-(3) all include at least APs 110-114, and a client 120. Client 120 communicates with APs 110-114 via AP coordination is facilitated via the use of client association reports (CARs) 150(1), 150(2). CARs 150 are data reports populated with data collected by and distributed amongst each AP 110-114 such that all APs have the same data or substantially the same data. We say "substantially the to SNR of non-associated but probing clients, number of associated clients, associated client MAC address, associated client SNR, and associated client current PHY/MCS rate, client communication capability (e.g., band, channel width, number of spatial streams, MU-MIMO, 802.11 amendments, AP data rates, etc.), client-APs moment vector (spatial and temporal), identification of problematic client (e.g., a sticky client), a Deny MAC Access List, and a list of SSIDs the client may probing (e.g., to provide functionality for steering one or more clients between SSIDs). AP data includes number of clients associated with each AP, AP communication capability (e.g., band, channel width, number of spatial streams, MU-MIMO, 802.11 amendments, and AP data rates), AP specific spatial areas or volumes of problematic communication, and AP backhaul cost relating to throughput and latency. Client-AP data includes optimal and non-optimal protocol or capabilities matches between a client and an AP, and optimal and non-optimal coverage area overlap between a client and an AP. CAR data, which is collected, shared, and processed by the APs 110-114, may be used to at least steer clients between APs or even bands (Client Link Management), and may be used to resolve at least the problems detailed in Table 1, above. APs also handle local Radio Resource Management (RRM), for example channel planning, Tx power, noise, neighbor reports, and 802.11k client reports. APs may also cooperate or coordinate to handle AP discovery, AP configuration (and auto-configuration), security, and act as an interface for upstream monitoring and management.

APs 110-114 may utilize CARs 150 data to control clients, such as client 120. For example, AP may disassociate a client based on processed CARs 150 data to initiate a client steering process. APs 110-114 may also implement and support a Deny MAC Access List to block connection or reconnection attempts by a client or disassociated client to further steer the client. In an embodiment 802.11v BSS Transition Management may also be utilized by APs to transition clients. Other possible protocols utilized by such a system and method include a simple UDP protocol, e.g., a combination of multicast and unicast messages and/or datagrams carried by datagram supporting protocols.

In FIG. 1A, system 100(1) is shown with client 120 in communication with AP 110 via association 160(1), with AP 112 via probe 162(1), and with AP 114 via probe 162(2). CARs 150(1) and 152(2) data is shared amongst APs 110-114, which provides the APs with information (described at least in part above) to determine and coordinate the association of client 120 with an AP that best supports that client. In the instance of system 100(1), FIG. 1A, that AP is AP 110.

In FIG. 1B, system 100(2) shows client 120 has moved away from AP 110 and toward AP 112, which illustratively represents AP 112 may be better situated to support client 120. Illustratively locating client 120 proximate AP 112 symbolically equates a reduced spatial distance with an increase in communication signal strength. One skilled in the art will appreciate that this representation is merely symbolic and may alternatively represent a non-spatial improvement in the communication situation between client 120 and AP 112 as compared to that of client 120 and AP 110 or AP 114. For example, this may represent an improved traffic load distribution by steering client 120 to AP 112, a better technology match between client 120 and AP 112, or something else.

System 100(2) also shows a steering request 152 sent from AP 112 to AP 110 and a steering response 154 sent from AP 110 back to AP 112, which is AP 110's reply to the steering request 152. In an embodiment, steering request 152 was triggered by the change in the wireless environment, e.g., the change in proximity, and therefore the signal strength, of client 120 relative to APs 110-114. Such a change may cause a monitored value to exceed (or alternatively deceed) a threshold value resulting in the initialization of a steering request action, such as that initiate by AP 112. AP 112 may additionally include or transmit separately an updated CAR 150 such that AP 110 (and possibly AP 114) may utilize the same data for decision making.

Steering request 152 is a request by AP 112 to AP 110 for AP 110 to handoff client 120 to AP 120 because AP 112 has determined that it can support client 120 better than AP 110. Upon receipt of steering request 152 AP 110 process the request (and possible the new CAR 150(1) if provided) to determine if AP 110 is in consensus with AP 112. If AP 110 is in consensus with AP 112 it will generate a steering reply 154 which coordinates the handover of client 120. If AP 110 is not in consensus with AP 112 it will generate a steering reply 154 rejects the handover of client 120. Examples in AP 110 may reject steering request 152 is where AP 110 has data not available or shared with AP 112 which informs AP 110 to rejected the request. Such data may include, for example, a history of failed steering attempts or may be AP 110's attempt to avoid client 120 from permanently blacklisting AP 110 in response to AP 110 temporarily blacklist client 120 to assist in steering the client to AP 112. In the example of FIGS. 1A-1C, AP 110 is in consensus with AP 112. System 100(3) of FIG. 1C shows client 120 now associated 160(2) with AP 112 and transmitting probes 162(3) and 162(4) to APs 110 and 114, respectively. System 100(3) also shows new CARs 150(3) and 150(4) shared amongst APs 110-114, which reflects changes to the wireless environment, namely client 120's association with AP 112 and disassociation with AP 110.

Figure 2:
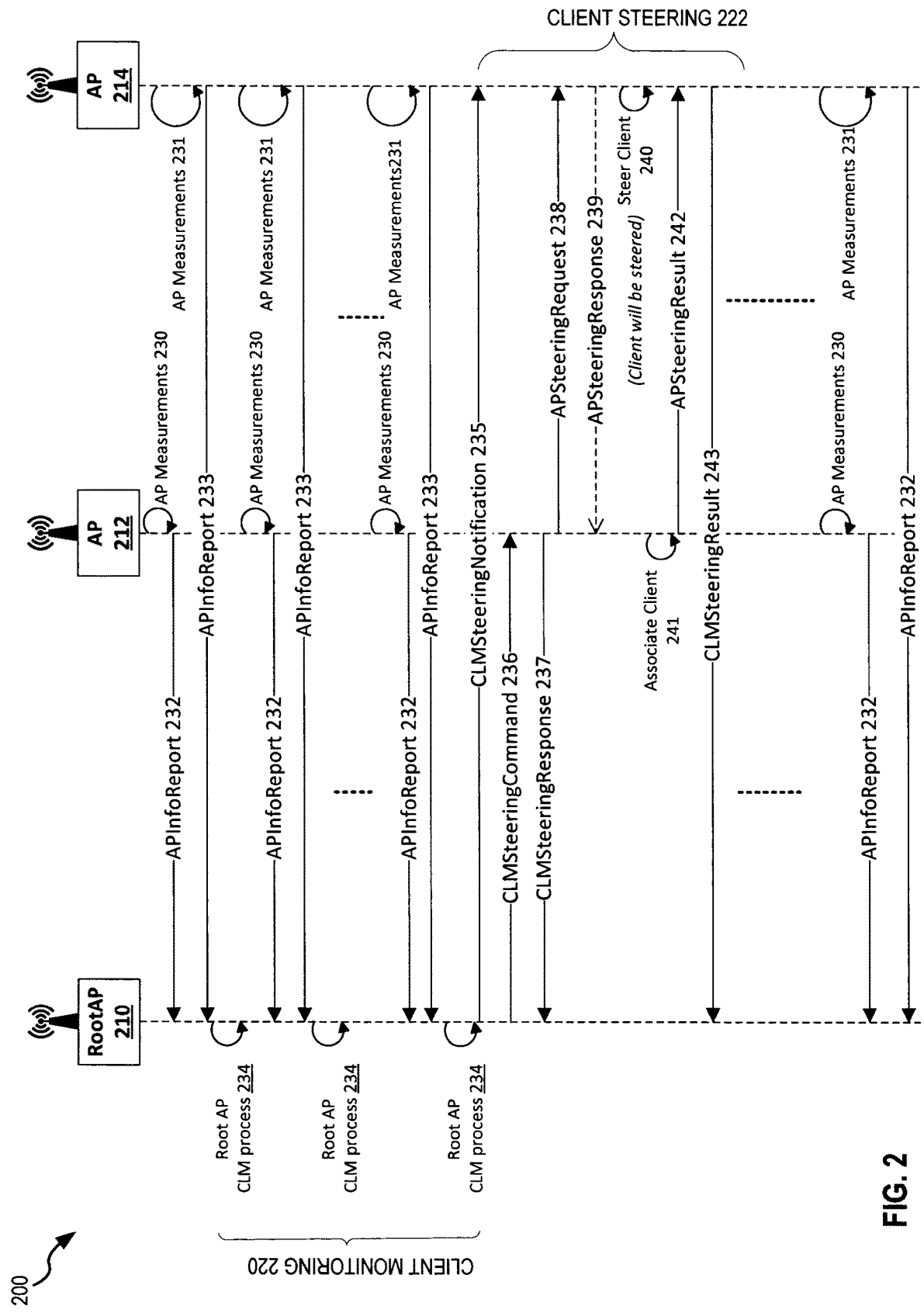
FIG. 2 is a timing diagram for a centrally controlled multi-AP system that includes a rootAP and two APs, in an embodiment.

FIG. 2 shows a timing diagram 200 for a centrally controlled multi-AP system that includes a rootAP 210 and two APs 212, 214. Timing diagram 200 includes a first client monitoring portion 220 and a second client steering portion 222.

In client monitoring portion APs 212, 214 take AP measurements 230, 231 and generate AP information reports (also called herein "APInfoReports"), similar or the same as CARs 150 of FIG. 1, described above. APInfoReports 232, 233 are then transmitted to rootAP 210 which process the APInfoReports 232, 233 via a root AP CLM process 234. These steps may occur a plurality of times until root AP 210 produces a CLMSteeringNotification 235. CLMSteeringNotification 235 informs AP 214 that root AP 210 has determined to steer an AP 214 associated client to AP 212.

RootAp 210 then transmits a CLMSteeringCommand 236 to AP 212, which directs AP 212 to initiate a steering request process which results in AP 212 transmitting a CLMSteeringResponse 237 to rootAP 210 and an APSteeringRequest 238 to AP 214. CLMSteeringResponse 237 is a response to rootAP 210's CLMSteeringCommand 236. APSteeringRequest 238 is a request made by AP 212 to AP 214 to cooperate to steer an AP 214 associated client to AP 212. AP 214 then optionally responds to the APSteeringRequest 238 by transmitting an APSteeringResponse 239 to AP 212 and steers client 240. In a separate example, AP 214 does not reach consensus with AP 212 (or rootAP 210) and rejects the steering request from AP 212. Rejecting the steering request from AP 212 may be by, for example, ignoring the request or may be by informing one or both of AP 212 and rootAP 210 that it will not disassociate the client.

Returning to the example of FIG. 2, after AP 214 steers client 240, AP 212 associates client 241. AP 212 then provides AP 214 with an APSteeringResult 242. AP 214 then transmits a CLMSteeringResult 243 to rootAP 210 to finalize the process and restart the AP measurement and APInfoReport processes 230-234, as similarly described above.

Figure 3:
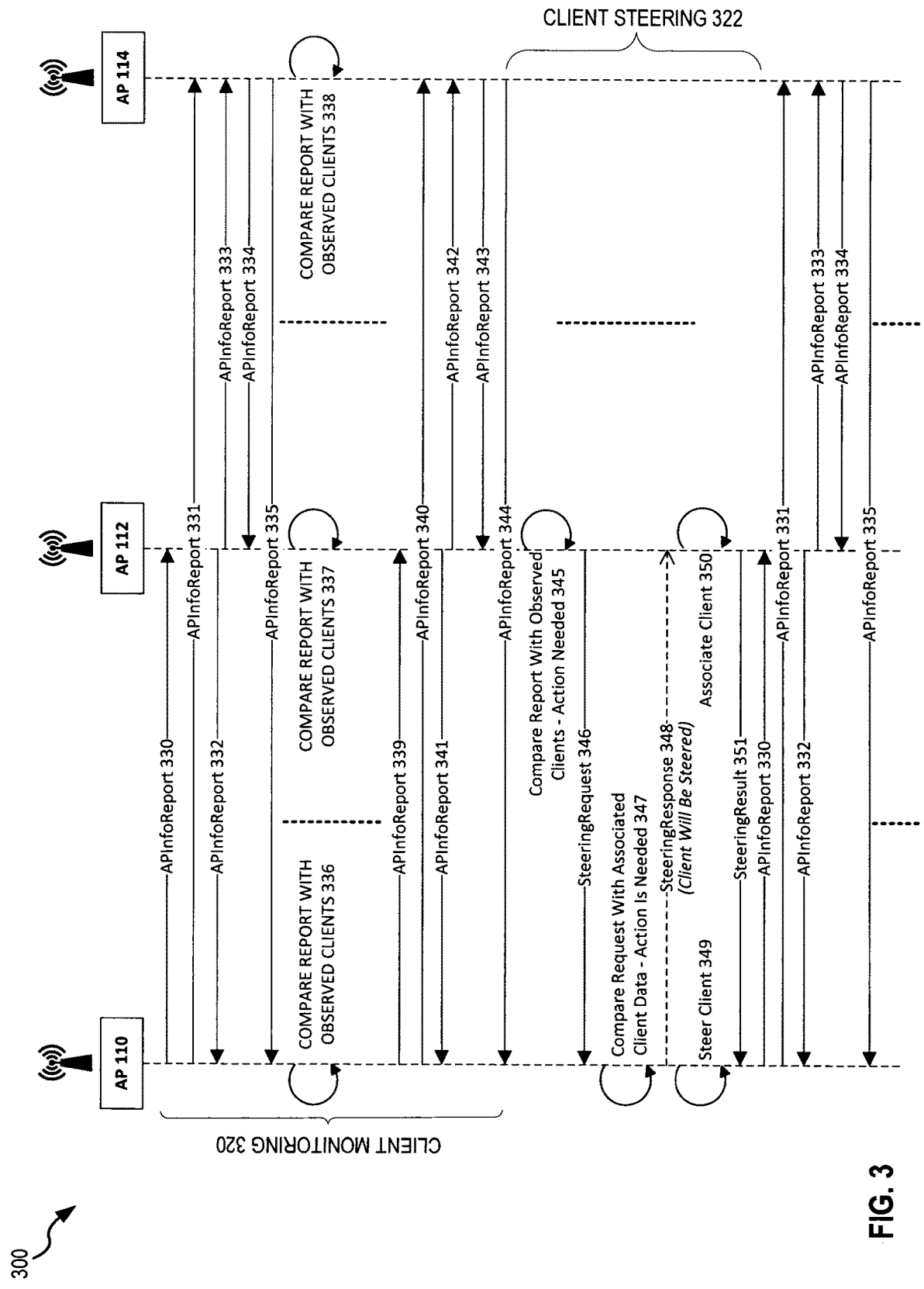
FIG. 3 is a timing diagram for a collaborative multi-AP system that includes three APs, in an embodiment.

FIG. 3 shows a timing diagram 300 for exemplary system 100 of FIG. 1, which includes APs 110-114. Timing diagram 300 includes a first client monitoring portion 320 and a second client steering portion 322.

APs 110-114 share AP Information reports APInfoReports 330-335. To simplify FIG. 3 AP measurements are not shown, but it will be understood that system 300 will periodically perform a measurement process, similar to the measurement process that generates AP measurement 230-231 of FIG. 2, of purposes of populating APInfoReport 330-335, 339-344. Each AP 110-114 the compares report with observed clients 336-338. APs 110-114 then again shares AP Information reports via APInfoReports 339-344 (also called CARs, such as CARs 150, herein).

AP 112 then compares the report with observed client-action needed 345. AP 112 the sends a steering request 346 to AP 110. AP 110 process the steering request in the compare request with associated client data—action is needed 347. In the situation where AP 110 arrives at a consensus with AP 112 (as similarly described in FIG. 1, above), the AP 110 transmits a SteeringResponse 348 to AP 112, which is processed resulting in AP 110 Steering Client 349 and AP 112 Associating Client 350. Steering Client 349 may be, for example, AP 110 disassociating the client and entering the client on a Deny MAC Access List (not shown but discussed above) such that the client will not re-associate and will be steer to AP 112, where it associates. AP 112 then optionally sends a steering result 351 to AP 110 to inform AP 110 of the successful association. APs 110-114 then again share AP information Reports via APInfoReports 330-335.

Figure 4:
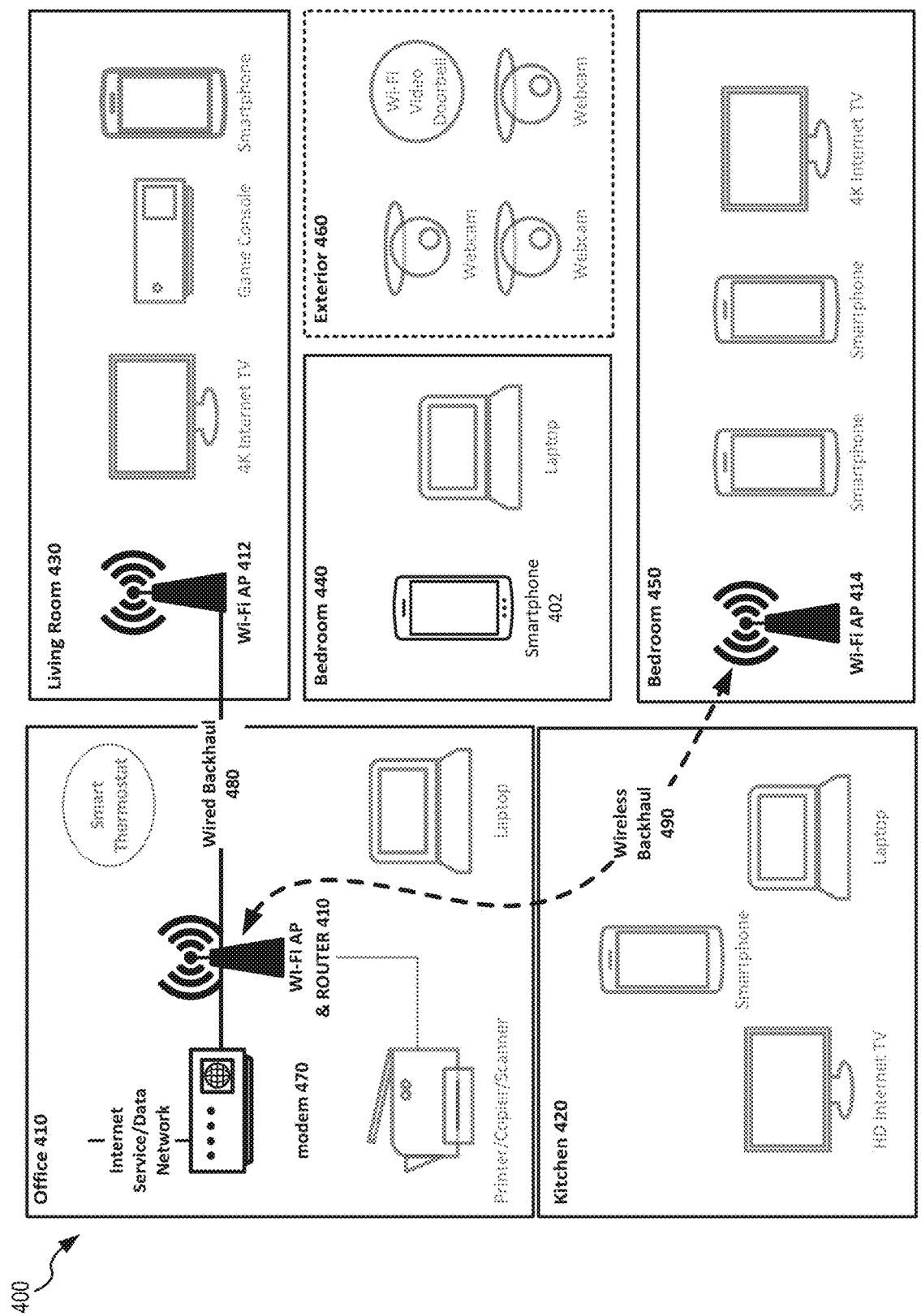
FIG. 4 shows a crowded multi-AP environment with three APs, in an embodiment.

FIG. 4 shows a crowded Multi-AP environment 400 with three APs, APs 410, 412, and 414. Multi-AP environment 400 includes an office 410, a kitchen 420, a living room 430, two bedrooms 440, 450, and an exterior space 460. In living room 430 is Wi-Fi AP 412. In bedroom 450 is Wi-Fi AP 414. In office 410 is a Wi-Fi AP and router 410 (also called herein gateway AP 410 or just AP 410), and a modem 470 (which may also be ONT 470 if implemented in an optical communication environment) connected to data network, such as the internet, a local area network, a DOCSIS network, an optical network, or similar.

Figure 5:
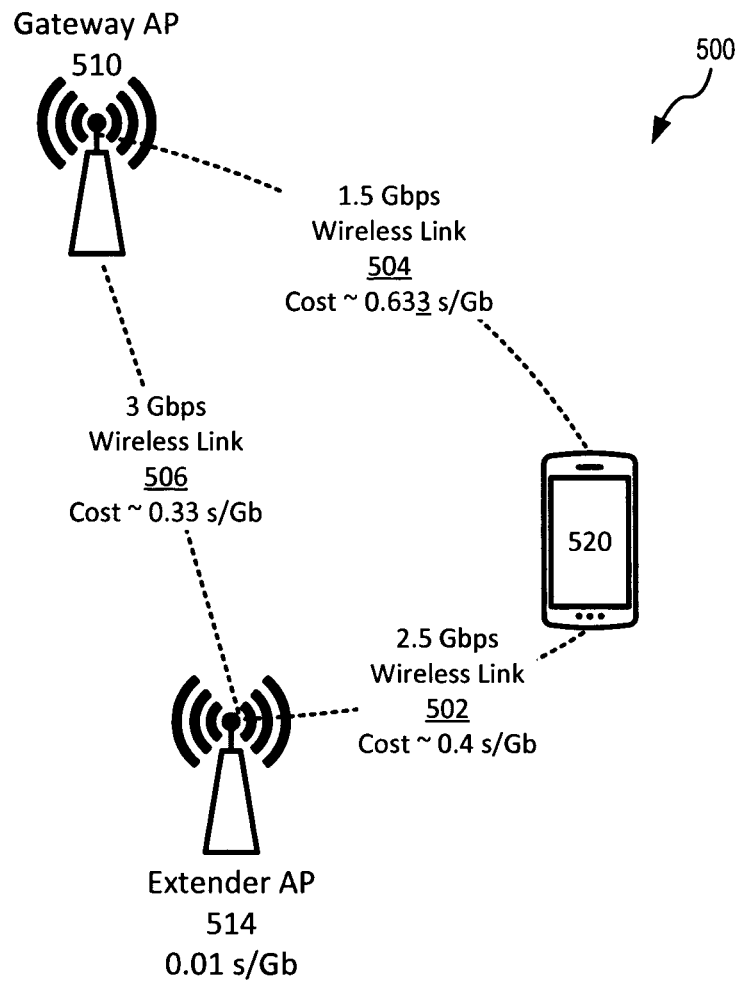
FIG. 5 shows one exemplary multi-AP system with data utilized in one least cost routing calculus, in an embodiment.

Environment 400 is shown with both a wired backhaul 480, between an AP 412 and a gateway AP 410, and a wireless backhaul 490, between an AP 414 and gateway AP 410. In such a multi-AP environment a least-cost routing calculus may be performed to determine the best path for data to travel. One exemplary least cost routing calculus is represented in FIG. 5, below.

Wireless clients within environment 400 have a plurality of connection options. As such APs may utilize a least-cost routing calculus to determine the best direct or indirect connection to gateway AP 410, and subsequently the internet. The least-cost routing calculus takes into consideration the time per gigabit (e.g., [seconds/Gb]) for wired transmission, wireless transmission, and data rate delays associated with internal processing delays. Internal processing delays may include but are not limited to time per gigabit for the transmission from a receiving side to a transmission side within an AP. Other internal delays may also exist, as will be known to one skilled in the art, but are not discussed here for sake of simplicity and brevity.

For example, smart phone 402 in bedroom 440 may connect to one of AP 410, 412, or 414. Connection to AP 414 would require a first wireless transmission from smart phone 402 to AP 414 having a first wireless date rate, and a second wireless transmission via wireless backhaul 490 from AP 414 to gateway AP 410 having a second wireless data rate. There is also an internal delay, as discussed above. Thus, the least-cost routing calculus determines a first path data rate (from smartphone 402 to AP 414 then to gateway AP 410) by summing first wireless date rate, plus the internal delay, plus the second wireless data rate. Other communication paths are also available to the smart phone. One exemplary second communication path is from smartphone 402 straight to gateway AP 410. A third communication path is from smartphone 402 to gate AP 410 via a wireless transmission from smartphone 410 to AP 412 and wired backhaul 480 from AP 412 to gateway AP 410. Through environment 400 measurements, shared CAR data (e.g., CAR 150 and APInfoReport 232-233, 330-335), AP coordination, and the least-cost routing calculus APs 410, 412, 414 may determine that the communication path with the best data through-put is, for example, the third communication path due to great through put on wired backhaul 480.

It will be understood that the above example is simplified and a plurality of variables may be utilized as inputs into the least-cost routing calculus when determining the best communication path. Some non-limiting examples of additional metrics includes inter AP compatibility, latency reduction mechanisms and protocols, technology and functionality matches and mismatches between clients and APs (including between a first AP and a second AP), etc.

FIG. 5 shows one exemplary system 500 with data utilized in one least cost routing calculus. Other data that may be utilized in other least cost routing calculus include but are not limited to maximized throughput, maximized goodput (i.e., application-level throughput), and a guaranteed QoS (e.g, based on at least one or more of a minimum throughput, maximum latency, maximum jitter, etc.).

System 500 includes a client 520, a gateway AP 510, and an extender AP 514. Client 520 is in two-way wireless communication with extender AP 514 via 1.5 Gbps wireless link 504 and gateway AP 510 via 2.5 Gbps wireless link 502. Extender AP 514 is in two-way wireless communication with Gateway AP 510 via 3 Gbps wireless link 506. The time per Gbit cost (hereinafter the "cost") for 1.5 Gbps wireless link 504 is ~0.633 s/Gbit. The cost for 2.5 Gbps wireless link 502 is ~0.4 s/Gbit. The cost for 3 Gbps wireless link 506 is ~0.33 s/Gbit. In addition the delay within extender AP 514 is ~0.001 s/Gbit.

A least cost routing calculus for association by client 520 with gateway AP 510 is therefore 0.633 s/Gbit. The least cost routing calculus for association with extender AP 514 is the sum of the costs of 2.5 Gbps wireless link 502, internal delay of extender AP 514, and 3 Gbps wireless link 506, which is 0.4 s/Gbit+0.01 s/Gbit+0.33 s/Gbit=0.74 s/Gbit. Thus, direct association by client 520 with gateway AP 510 results in the best performance for client 520.

Other factors may contribute to the least cost routing calculus, including but not limited to available AP resources, throughput on the links (e.g., number of retries on the link, BER, etc.). The least cost routing calculus may advantageously rely on AP measured and shared data (e.g., CAR 150, APInfoReport 232-233, AP Measurements 230-231, APInfoReport 330-335, 339-344, etc.) and distributed through the system, e.g., system 100, 200, 300, 400, and 500.

Figure 6:
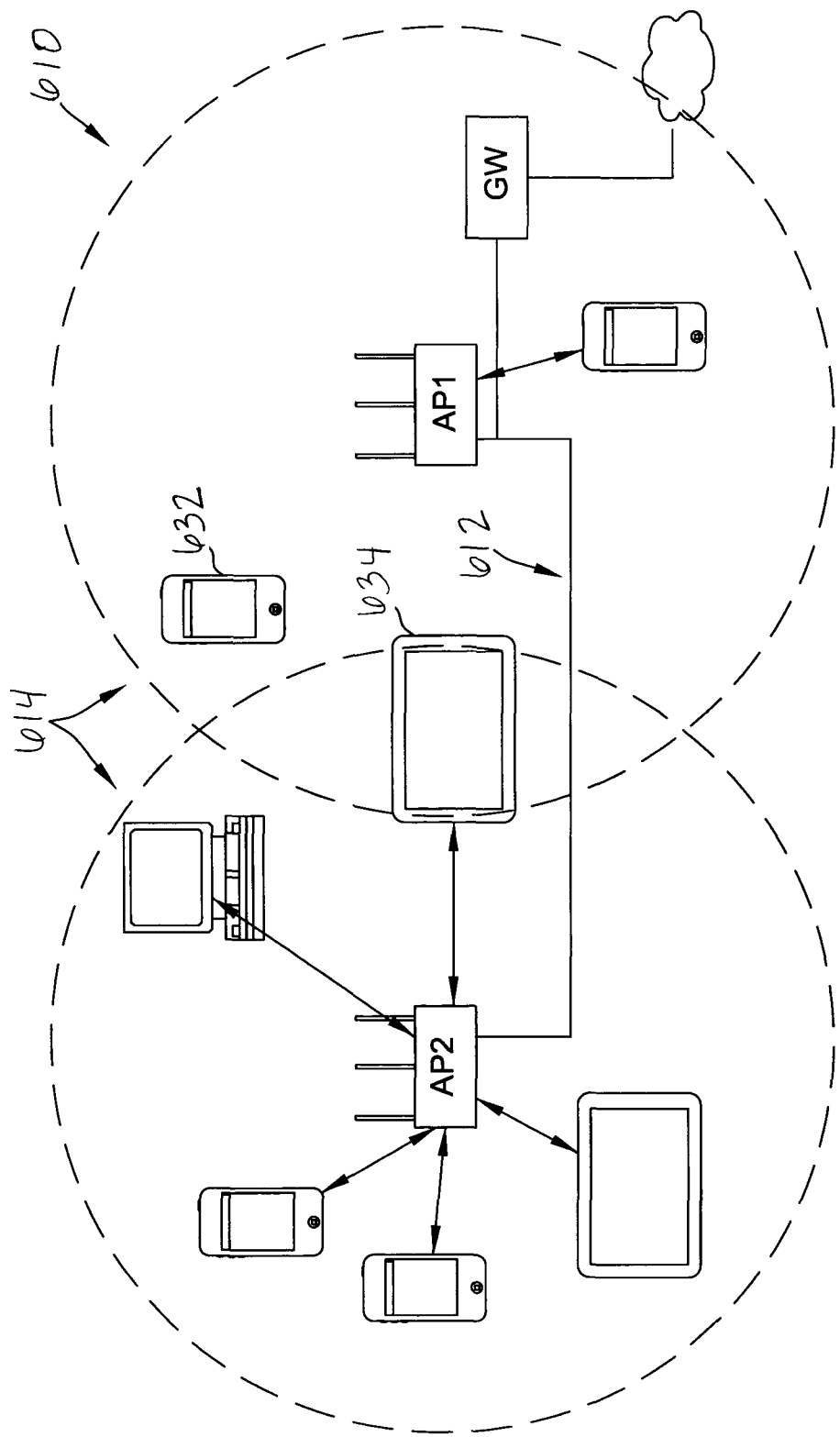
FIG. 6 illustrates a system having AP coordination in accordance with one non-limiting aspect of the present invention.

FIG. 6 illustrates a system 610 having access point (AP) coordination in accordance with one non-limiting aspect of the present invention. The system 610 may include a plurality of APs 612 having capabilities sufficient to facilitate interfacing wireless signals with a plurality of clients 614. The clients, which may optionally be referred to as stations (STAs), and the APs connected or associated therewith (solid lines) may operate according to any suitable communication protocol, and are predominately described for non-limiting purposes as providing Wi-Fi signaling in accordance with Institute of Electrical and Electronics Engineers (IEEE) 802.11: Telecommunications and information exchange between systems—Local and metropolitan area networks—Specific requirements—Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. The exemplary description of the present invention may be utilized with non-Wi-Fi environments and is predominant described with respect to Wi-Fi for non-limiting purposes in order to demonstrate the capability of the present invention to facilitate coordination within a wireless networking environment where APs or other client interfaces may lack sufficient capabilities to coordinate activities for purposes of maximizing network optimization and performance, including but not limited to maximizing network optimization and performance with respect to sticky clients, AP overloading, radio frequency (RF) interference, excessive AP switching ("ping-ponging"), etc.

The system 610 is shown to include three APs operating to facilitate interfacing the clients with an external or wide area network (WAN), such as that associated with an Internet service provider (ISP) or other multiple system operator (MSO). A first AP (AP1) and a second AP (AP2) are shown with respect to wireless service area associated therewith, and a third device is shown to be acting as a gateway (GW). The GW is shown to be a standalone item from AP1 for exemplary purposes as the functionality associated therewith may be integrated or part of AP1 and/or, the operations and capabilities of AP1 may be part of the GW. All data or other information/messaging intend to be interface with the clients, collectively referred to as client data, and intended for exchange over the WAN may be required to pass through the GW such that the GW may be considered as the last link or hop between the WAN and the plurality of APs, i.e., any data originating with the clients for transmission to the WAN and any data originating on the WAN for transmission to the clients may pass through the GW. The wireless signaling of the APs may be utilized to facilitate exchanging client data with the clients whereupon the exchanged client data may be communicated over a first local area network (LAN) 612 established between the APs, which may be referred to as a backhaul network. The wireless signaling associated with the APs (shown with dashed circles centered at AP1 and AP2) may form a second local area network 614 over which the clients communicate with APs such that the system 610 includes two LANs 612, 614—one 614 for communication between the APs and the clients and one 612 for communication between the APs.

The second LAN 614, i.e., the network 614 for facilitating communications between the APs and the clients, may be entirely composed of wireless signaling associated with the APs. One non-limiting aspect of the present invention contemplates the system operating in a home or other location where it may be desirable to provide a singular interface for subscribers, such as to allow subscribers to easily locate their wireless network (the second LAN 614) without having to distinguish the particular AP facilitating communication with the client/device they are using. The APs may enable the singular interface concept through use of the same service set ID (SSID), i.e., each AP may broadcast identical SSIDs and facilitate wireless signaling optionally over multiple bands and/or channels. The APs may be considered to be collectively part of the same extended service set (ESS) and utilize different basic service set IDs (BSSIDs) for each basic service set (BSS), e.g., each AP in the illustrated example other than the GW, so as to enable the clients to associate with the second LAN 614 without the subscribers having to distinguish one AP from another. The first LAN 612 may be distinguished from the second LAN 614 at least in so far as the clients being unable to connect with or associate with the first LAN 612 or otherwise access signaling communicated thereover. The signaling may be carried over the first LAN 612 wirelessly and/or wiredly between the APs, e.g., part of the first LAN 612 may be wireless and another part may be wired, and/or part of the same communication medium as the second LAN 614, such as through tunneling, virtual networking, etc.

One non-limiting aspect of the present invention contemplates executing a coordination protocol amongst the APs to facilitate network optimization through steering of clients from one AP to another AP. The contemplated coordination and client steering may be executed between the APs, i.e., with APs making decisions and instructing the corresponding operations of the clients, as opposed to and optionally independently of roaming or other client-based capabilities to facilitate associating and disassociating with other APs. The AP coordination capabilities of the present invention may be considered to be distinct and separate from individual capabilities of the clients to make 802.11 roaming decisions or other decisions associated with assessing AP suitability. Such client-based capabilities may optionally be used to augment or supplement the coordination contemplated herein and/or completely or partially disabled or overridden in favor of relying upon the AP coordination to facilitate client associations and/or disassociations with the APs. The AP coordination may include the APs exchanging associated client reports (ACPs) and utilizing client information and/or other data included therein or transmitted therewith to facilitate steering operations where clients may be individually instructed by or controlled through the APs to associate and/or disassociate from particular APs for purposes of addressing network performance and optimization metrics.

Figure 7:
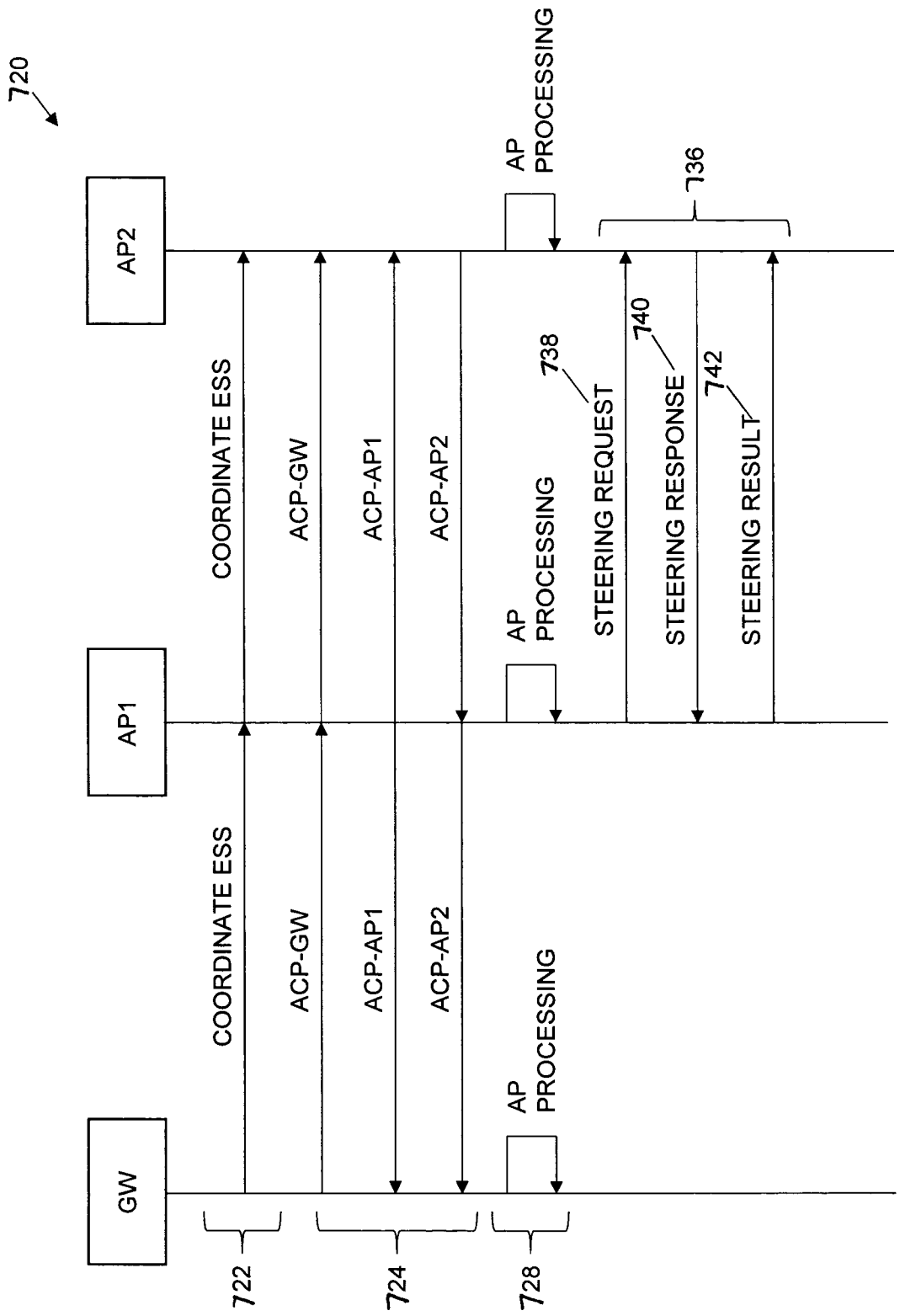
FIG. 7 illustrates a diagram of a method for AP coordination in accordance with one non-limiting aspect of the present invention.

FIG. 7 illustrates a diagram 720 of a method for AP coordination in accordance with one non-limiting aspect of the present invention. The method generally relates to the APs establishing a coordinator relationship and thereafter utilizing the coordinated relationship to facilitate steering clients from one AP to another in a manner sufficient to optimize network capabilities and performance. The AP coordination may be distributed insofar as the APs may each include capabilities sufficient to facilitate making decisions and requesting APs and/or clients to execute in response thereto. The distributed nature of the contemplated AP coordination may be beneficial in enabling a home networking environment where network performance capabilities may be optimized without having to employ a wireless local area controller (WLC), or at least a WLC within the home or as part of or downstream of the GW. Each of AP may include a non-transitory computer-readable medium having a plurality of non-transitory instructions stored thereon and executable with a processor to facilitate one or more of the operations contemplated herein. The AP coordination may commence with the APs executing a coordinate ESS process 722 where the APs may discover each other, such as through a UPnP or other suitable protocol, and thereafter establishing the first LAN 612 or otherwise perform operations sufficient to facilitate exchanging configuration, programming, variables and other information contemplated herein to facilitate steering clients, e.g., the coordinate ESS process 722 may instigate as new APs are added and/or removed from the home.

One non-limiting aspect of the present invention contemplates the APs utilizing security, encryption or other mechanisms to protect communications over the first LAN 612, such as to prevent snooping by the clients and/or other devices attempting to direct or control the clients to perform a steering operation in an unauthorized manner. The security and privacy of all information exchanged between the APs may be facilitated through: identification and authentication of each AP within the ESSID (e.g., mutual authentication); setting up a secure channel between all the APs; and ensuring confidentiality and integrity of the data (specifically client information data). The APs may coordinate exchange of information about all the clients connected to the ESS to ensure that each client's privacy/confidentiality is maintained, including: assuring information about each client, i.e. its mac address, client's make and model, firmware version etc., which maybe be included in exchanged messaging, are transmitted over an encrypted or secured channel to thwart client/user tracking and open up other attacks on the client and to assure that information is exchanged over a secure channel only between authenticated AP's; maintaining the system according to an inter-AP protocol so as to thwart a rogue device within an ESS may impersonate itself as an AP for purposes of receiving information about other clients; verifying each message received by an AP for authenticity and that the secure channel associated channel not prone to a man-in-the-middle attack or DoS attacks/threats; attaches where a rogue AP or a malicious client (or a man-in-the-middle) can send malicious messages that would trigger client(s) to be steered towards itself (e.g. by falsely claiming high RSSI with a client) which can result in the client getting disconnected from its existing AP and being denied service; and spoofing attacks where rogue client within an ESS may impersonate/spoof other client(s) and result in an AP incorrectly detecting the target client's connection parameters which may result in the attack target being incorrectly steered to a sub-optimal AP.

These and other attacks on the system 610 may be addressed with various security measures, which may include: an AP authentication where each AP needs to be registered and authenticated within the ESS before starting the coordinated communications contemplated herein, which may optionally be done at the time of AP deployment within the ESS, and which may be accomplished using embedded X.509 certificates within an AP and/or shared password/PSK specifically for the AP Coordination Protocol which is configured on each AP, which may be different from the PSK configured for the SSID/ESSID); securing communications using TLS/DTLS for communication, which may include suites based on authentication mechanism and/or use of a WPA2-PSK key with PAKE to create a TLS/DTLS channel using either the shared password or certs to authenticate the PAKE; and/or message integrity/confidentiality by requiring signing of each message, if backed by X.509 certs, just a mutually authenticated TLS/DTLS channel may be sufficient. The ability of the APs to securely share configuration, programming, variables and other information associated with executing the coordinate ESS process may be beneficial in allowing the APs to establish parameters for metrics and decisions to be made based on the client information and other data included within the ACPs to be exchanged thereafter.

The coordinate ESS process 722 may include the APs communicating with each of the other APs, either directly (e.g., unicast/multicast) or through a daisy-chain or other means, so as to facilitate establishing the first LAN 612 or other suitable backhaul network therebetween in a manner that allows for information to be securely exchanged thereafter, and optionally in a manner sufficient to establish a control plane independent of the clients. The information shared between the access points as part of the coordinate ESS process 722 may include a number of configuration parameters to be utilized when the APs make during decisions and other operational executions. One non-limiting aspect of the present invention contemplates the configuration parameters including one or more of the following: an AssociatedClientReportFrequency variable indicating how often each AP sends ACPs over the first LAN; a SteeringRequestResponsePeriod variable indicating how long each AP has to send a SteeringRequest after receipt of one of the ACPs and how long each AP must wait for receipt of all SteeringRequests after sending one of the ACPs; a 5GHzTo2_4GHzPreference variable indicating a maximum amount that a signal-to-noise ratio (SNR) of a 5 GHz basic service set (BSS) can be lower than a SNR of a 2.4 GHz BSS on the same AP to steer one or more clients from the 2.4 GHz BSS to the 5 GHz BSS; an APToAPSNRSteeringThreshold variable indicating a minimum SNR difference between the SNR of one of the APs relative to another one of the APs to warrant steering one of the clients; a PingPongOccurances variable indicating a maximum number of times one or more of the clients can ping-pong back and forth between APs within PingPongTime seconds before the one or more of the clients is steered to it the AP with a higher media access control (MAC)address; a PingPongTime variable indicating a time period during which ping-pongs are counted; a PingPongHysteresis variable indicating a minimum difference that SNR must be between two APs before a client characterized as ping-pong can be steered to another AP; a ReceivedProbeStaleTimer variable indicating how long probe request information is to be retained on the APs before being discarded; and a MaximumSteeringTimeout variable indicating maximum time that the APs permit the client to associate before indicating a failure.

An ACP exchange process 724 may commence after the APs have established the first LAN 612 and communicate the configuration parameters and other information associated with coordinating the activities necessary for supporting wireless services in the contemplated manner. The ACP exchange process 724 may include the APs each generating an ACP and then communicating that ACP to each of the other APs. The ACPs may be files, XML schema, documents or other constructs sufficient for communicating information between the APs. The individual ACPs may include client information regarding the clients associated therewith, i.e., information regarding ongoing communications with the associated clients, and/or client information non-associated clients, i.e., clients that may not be actively associated with the AP but in communication therewith or in a wireless range thereof.

Figure 8:
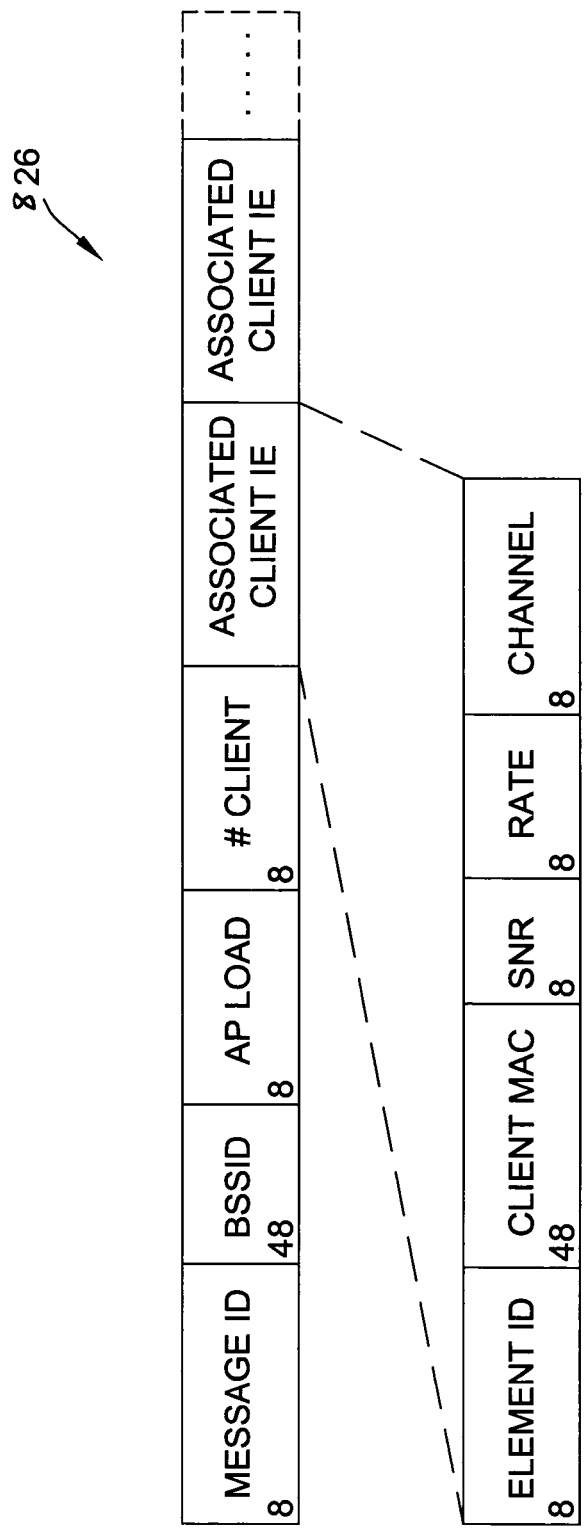
FIG. 8 illustrates an ACP message for communicating or supplementing communication of an ACP from one AP to another in accordance with one non-limiting aspect of the present invention.

FIG. 8 illustrates an ACP message 826 for communicating or supplementing communication of an ACP from one AP to another in accordance with one non-limiting aspect of the present invention. The ACP message 826 may be formatted as shown to include the BSSID of the originating AP, the originating AP load/airtime utilization, the number of clients (N) in the ACP (associated with the originating AP), and N AssociatedClientIEs (identifiers of each client). The AssociateClientIE may contain the AssociatedClient Element ID (0x81) and the AP (associated) observed client information including the client MAC address, the SNR of the client, and the current PHY rate that the client is achieving and channel number of the BSS that the client is utilizing.

The ACPs, the ACP messages 826 or other client information shared as part of the ACP exchange process may optionally include: client association metrics for indicating at least one of a number of associations and a number of disassociations; current client link metrics for each associated client indicating at least one of throughput, packet error rate (PER), relative signal strength indicator (RSSI), signal-to-noise ratio (SNR) and modulation encoding scheme (MCS) index value; client capabilities for each associated client indicating at least one of supported operating channels and bands, support for 802.11k or 802.11v, Wi-Fi Alliance (WFA) Agile Multi-Band™ and Optimized Connectivity Experience (OCE)™; client channel utilization/load per basic service set (BSS); client band association history for each associated client; desired band for each associated client; and client steering history for each associated client, i.e., whether the client has been steered before. In addition to such client information, the APs may include additional information within the ACPs or otherwise exchanged as part of the ACP process 724. This additional information may include: link quality metrics for communication with the gateway that indicate at least one of throughput, jitter and latency; communication capabilities of the AP for available channels, available bands, channel width, auto channel selection, supported transmit powers and whether 802.11h is supported; current settings, the current settings for channels in-use, extension channel(s), guard Interval, transmit power, whether 802.11h is supported, and regulatory domain; observed noise floor per channel; and relative location of the AP to each of the other APs in dB if known.

The client information and that additional information noted above may be distinguished from other information made available to the AP from the client, such as through sharing of radio resource measurements (RRM) in compliance with IEEE 802.11k. The RRM or other information provided from the client may include neighbor reports for extended service set (ESS) and non-ESS neighbors, the neighbor reports including channel, QoS capable, automatic power save delivery (APSD) capable, whether part of a mobility domain, throughput capabilities and BSS Transition Management preferences; and/or traffic stream and traffic category measurement reports. One non-limiting aspect of the present invention contemplates contrasting the information collected in accordance with the described AP coordination versus the information commonly employed in IEEE 802.11 implementations as the information collected in accordance with the present invention may be independent of and different than that utilized in IEEE 802.11, particularly with respect to the information shared between APs and the decisions APs make based thereon due to the IEEE 802.11 implementations relying upon client decisions when executing roaming operations whereas the present invention relies upon AP decisions when executing steering operations, which may optionally execute in cooperation with or in addition to the client-based roaming operations.

An AP processing operation 728 may commence once the APs have received an ACP from each of the other APs and/or in response to some other triggering event, such as in response to detection of poor network performance. The ACPs may optionally be transmitted every X number of seconds from the APs such that the AP processing operation 728 occurs at a corresponding interval of X seconds offset from completion of the ACP exchange process 724. The AP processing operation 728 may include the APs each individually assessing the ACPs received from the other APs relative to their observed clients, i.e., the clients associated therewith already or otherwise available for association or within view thereof. The AP processing operation 728 may include the APs individually making decisions regarding network performance and capabilities, including those associated with steering clients, and otherwise executing operations to request other APs to act in accordance with those decisions, such as to request another AP to steer a particular client thereto and/or to request another AP accept a client therefrom. One non-limiting aspect of the present invention contemplates the AP processing operation 728 being sufficient to facilitate one or more of the AP coordination decisions noted in Table 1, above, and in consideration that AP3 may correspond with the GW or an additional AP within the system.

FIG. 6 illustrates a sticky client scenario where a first client (client #1) 632 is associated with AP2 while beyond a service area of AP2 (dashed lines centered at AP2) or desired signaling range (RSSI) of AP2 and while within a service area of AP1 (dashed lines centered at AP1). Such a scenario may correspond with the AP2 determining from the shared ACPs that the client is associated with AP1 and using a very low PHY rate compared to what it is expected to achieve on AP1, which may occur when the client fails to roam on its own. The resulting AP coordination may include AP1 making a decision to execute a steering operation sufficient for directing the client to a target AP, i.e., AP1. The sticky client scenario may also be addressed using the exchanged ACPs by determining whether a transmission rate for communications between the currently connected AP2 and the client is below a threshold associated with a sticky-client characterization and making a decision to steer the client to AP1 over a third AP (GW with a collocated AP or another AP) when a relative signal strength indicator (RSSI) of AP1 is greater than a second RSSI of the third AP. The threshold utilized for determining a sticky-client characterization may be set according to one of the configuration parameters and/or as a function of network throughput, which may optionally include setting the threshold to be greater when the network throughput is greater and less when the network throughput is less. The network throughput may be used to indicate an amount of client data being exchanged between the clients and the WAN over a period of time.

An overloaded AP scenario may occur when one of AP1 and AP2 are overloaded when a client 634 is within both of their service areas. Such a scenario may correspond with AP2 (the target AP) seeing that a neighboring AP (AP1) is overloaded (based on AP loading information exchanged in the ACPs) and detecting that the client could obtain better performance on it (the target AP) than the overloaded AP. The resulting AP coordination may include AP2 making a decision to initiate a client steering request after it sees that the source AP (AP1) is overloaded compared to itself, and that some of the clients could be steered to the target AP. A similar scenario may occur with steering the client 634 from one band to another band of AP1, e.g., the target and source APs may be the same AP with a decision being made to steer a client from a 2.4 GHZ band to a 5.0 GHZ band. A dual-band, low bandwidth scenario may occur when an AP has a client connected on the 5 GHz band that is a low-bandwidth stationary client (e.g. a printer—based on the MAC OUI or based on deep packet inspection of traffic to/from the client) while the same the AP also sufficiently hears the client on 2.4 GHz. The resulting AP coordination may include the AP deciding to steer the client to its 2.4 GHz band from its 5 GHz band. A "ping-pong" scenario may occur when APs see a client change its association between them more than 4 times in 30 seconds. The resulting AP coordination may include the AP with the lower AP load deciding to steer the client to it and the other AP to not let the client move back to it until the RSSI changes significantly as specified in the configuration parameters.

The steering decisions based on the configuration parameters may include: a client being steered from 2.4 GHz to the 5 GHz band on the same AP if the 5 GHz SNR is greater than or equal to the 2.4 GHz SNR-15 dB (5GHzTo2_4GHzPreference); a client being steered from another AP if the SNR difference is greater than or equal to 9 dB (APToAPSNRSteeringThreshold); a client being steered from the source AP if the source AP has 4 more clients (APClientLoadNumClientsDifferential) than the target AP as long as the client difference is within 12 dB (APClientLoadSNRDifferential); a client being be steered to the AP with the lowest load when seen to "ping-pong" on its own between two APs more than 4 times (PingPongOccurances) in 30 seconds (PingPongTime); keeping a client from being "ping-ponged" back and forth between two AP, in the case where the SNRs are nearly the same, a client will not be steered to another AP until the SNR changes by more than 6 dB (PingPongHysteresis). (The foregoing values are merely exemplary and believed to correspond with a best mode for managing and balancing network performance and capabilities. The values may be adjusted, increased or decreased as desire to correspondingly affect behavior of the system to match an user or MSO/ISP goals.)

The ability to share ACPs between APs and thereafter enable the APs to collectively and/or to independently assess the data included therein for purposes of assessing network performance capabilities may be particularly beneficial in the above-described manner to facilitate addressing scenarios particularly affected by client activities, i.e., whether the client is connected to certain APs and the nature of the client's connection and activities. Additional decisions to implement a steering operation may be determined for non-client based reasons or in a manner independent of client activities, such as to facilitate network maintenance, software updates or other procedures where it may be beneficial to temporarily steer clients from one AP to another in order to address operations at a source AP. One such scenario may arise when an AP or radio attempting to or otherwise desiring to implement a scanning for interference, on or off the current operating channel, may disrupt servicing of clients. The disruption may be minimized through AP coordination where a decision may be made to steer clients away to other APs, then use that source or steered-from AP or radio to do any needed scanning, whereafter the clients may be steered back. This type of AP coordination can be used to "vacate" an AP or radio by steering clients to another AP or radio (albeit, possibly lowering client performance) to free up an AP or radio to do in-depth scanning of the entire RF environment, after which the AP could signal to the other APs the exchange of the ACPs that it is again ready to handle clients.

The AP processing operation 728 may result in a decision to execute a steering operation whereupon each of the APs deciding to execute such a steering operation may commence a corresponding steering operation. While multiple APs may commence steering operations, FIG. 7 illustrates an exemplary steering operation 736 between AP1 and AP2, which may be characteristic of the operations associated with facilitating steering operations for any one of the other APs. When AP1 (target) decides that a client should be steered to it, it may send a steering request message 738 to AP2 (source) that the client is associated with. The source AP (AP2) may then respond with a steering response message 740 indicating whether or not it will steer the client to the target AP (AP1). In order to avoid an event where two target APs respond with a steering request message 738 to the source AP, the source AP may be required to wait a minimum of Y*X seconds to receive all steering request messages 738 from the time it receives the first steering request message 738. One method for steering the clients may include 802.11v BSS transition management for disassociating a client and then Blacklisting (i.e. ignoring Probe Requests/Association Requests from a client) at the source AP. Both the source and target APs may tell each other all the steering methods they support within the shared ACPs so that the source AP can look at the supported steering methods of the target AP and choose the best method supported by both of them, which may be identified in the steering request message 738.

The source AP may receive multiple steering request messages 738 from different APs and assess those requests versus the ACPs to decide which request, or even none, it wants to grant. Optionally data included as part of the ACPs or the configuration parameters may dictate automatic action on the part of the source APs, such as by granting all steering request, and/or including algorithms or other mechanisms for making decisions on whether to grant a steering request, such as by comparing target AP loading/airtime utilization and target AP viewed RSSI of client to thresholds defined relative to the source AP situation or other benchmarks. The target AP may be required to always send a steering result message 742 to the source AP, whether or not the steering is successful. If successful, the target AP may send the steering result message 742 as soon as the client associates to it with a result code indicating a success. If the client does not associate to the target AP within Z seconds, e.g., 10 seconds, of the target AP receiving the steering response message, the target AP may indicate a failure result code within the steering result message 742. The result may be used to tell the source AP if the client was successfully steered to the target AP or if the steering failed. The source AP may remove any restrictions on that client reassociating, with the exception of the case of a ping-ponging client, if successful, and if unsuccessful (failure), the source AP may allow the client to reassociate. If the client still fails to reassociate or fails to remain associated until the SNR of the drops below a threshold (e.g. −75 dBm), the client will be marked as a steering failure so that it may be treated differently in the future.

Figure 9:
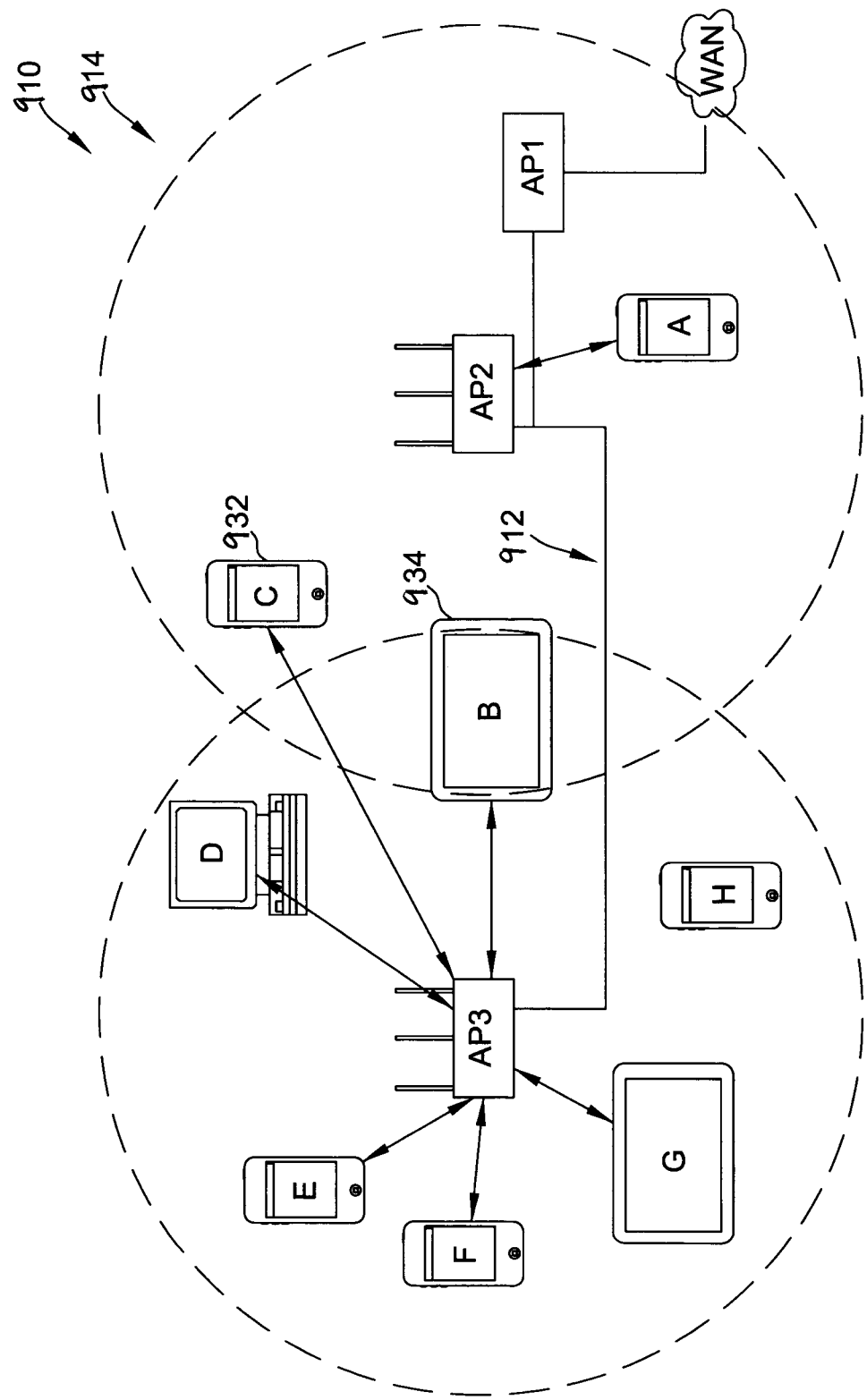
FIG. 9 illustrates a system having client steering in accordance with one non-limiting aspect of the present invention.

FIG. 9 illustrates a system 910 having client steering in accordance with one non-limiting aspect of the present invention. The system 910 may include a plurality of APs having capabilities sufficient to facilitate interfacing wireless signals with a plurality of clients. The clients, which may optionally be referred to as stations (STAs), and the APs connected or associated therewith (solid lines) may operate according to any suitable communication protocol and are predominately described for exemplary, non-limiting purposes as providing Wi-Fi signaling in accordance with Institute of Electrical and Electronics Engineers (IEEE) 802.11: Telecommunications and information exchange between systems—Local and metropolitan area networks— Specific requirements—Part 11: Wireless LAN Medium Access Control (MAC) and Physical Layer (PHY) Specifications, 2012, and/or other specifications within the IEEE 802.11 series, including but not necessary limited to 802.11k, 802.11u and 802.11v, the disclosures of which are hereby incorporated in their entireties by reference herein. The exemplary description of the present invention may be utilized with non-Wi-Fi environments and is predominant described with respect to Wi-Fi for non-limiting purposes to demonstrate the capability of the present invention to facilitate client steering within a wireless networking environment where APs may be utilized to provide network-based or network-centric decisions associated with clients switching from one AP to another.

The system 910 is shown to include three APs operating to facilitate interfacing the clients with an external or wide area network (WAN), such as that associated with an Internet service provider (ISP) or other multiple system operator (MSO). A first AP (AP1) is shown to also be acting as a gateway (GW) with a second AP (AP2) and a third AP (AP3) are shown to be connected downstream therefrom. All data or other information/messaging intend to be interface with the clients, collectively referred to as client data, and intended for exchange over the WAN may be required to pass through the AP1 such that AP1 may be considered as the last link or hop between the WAN and the plurality of APs, i.e., any data originating with the clients for transmission to the WAN and any data originating on the WAN for transmission to the clients may pass through AP1. The wireless signaling of the APs may be utilized to facilitate exchanging client data with the clients whereupon the exchanged client data may be communicated over a first local area network (LAN) 912 established between the APs, which may be referred to as a backhaul network. The wireless signaling associated with the APs (shown with dashed circles centered at AP1, AP2 and AP3) may form a second local area network 914 over which the clients communicate with the APs such that the system 910 includes two LANs 912, 914—one 914 for communication between the APs and the clients and one 912 for communication between the APs.

The second LAN 914, i.e., the Wi-Fi or other network 914 for facilitating communications between the APs and the clients, may be entirely composed of wireless signaling associated with the APs. One non-limiting aspect of the present invention contemplates the system 910 operating in a home or other location where it may be desirable to provide a singular interface for subscribers, such as to allow subscribers to easily locate their wireless network (the second LAN 914) without having to distinguish the AP facilitating communication with the client/device the subscriber is using. The APs may enable the singular interface concept through use of the same service set ID (SSID), i.e., each AP may broadcast identical SSIDs and facilitate wireless signaling optionally over multiple bands and/or channels. The APs may be collectively part of the same extended service set (ESS) and utilize different basic service set IDs (BSSIDs) for each basic service set (BSS), e.g., each AP in the illustrated example, to enable the clients to associate with the second LAN 914 without the subscribers having to distinguish one AP from another. The first LAN 912 may be distinguished from the second LAN 914 at least in so far as the clients being unable to connect with or associate with the first LAN 912 or otherwise access signaling communicated thereover. The signaling may be carried over the first LAN 912 wirelessly and/or wiredly between the APs, e.g., part of the first LAN 912 may be wireless and another part may be wired, and/or part of the same communication medium as the second LAN 914, such as through tunneling, virtual networking, etc.

One non-limiting aspect of the present invention contemplates executing a coordination protocol amongst the APs to facilitate network optimization through steering of clients from one AP to another AP. The contemplated coordination and client steering may be executed between the APs, i.e., with APs making decisions and instructing the corresponding operations of the clients, as opposed to and optionally independently of roaming or other client-based or client-centric capabilities to facilitate associating and disassociating with other APs. The AP coordination capabilities of the present invention may be distinct and separate from individual capabilities of the clients to make 802.11 roaming decisions or other decisions associated with assessing AP suitability. Such client-based capabilities may optionally be used to augment or supplement the coordination contemplated herein and/or be completely supplanted or partially disabled or overridden in favor of relying solely upon the AP coordination to facilitate client associations and/or disassociations with the APs. The AP coordination may include the APs exchanging associated client reports (ACRs) and utilizing client information and/or other data included therein or transmitted therewith to facilitate client steering operations where clients may be individually instructed by or controlled through the APs to associate and/or disassociate from APs for purposes of addressing and optimizing network performance and optimization metrics.

Figure 10:
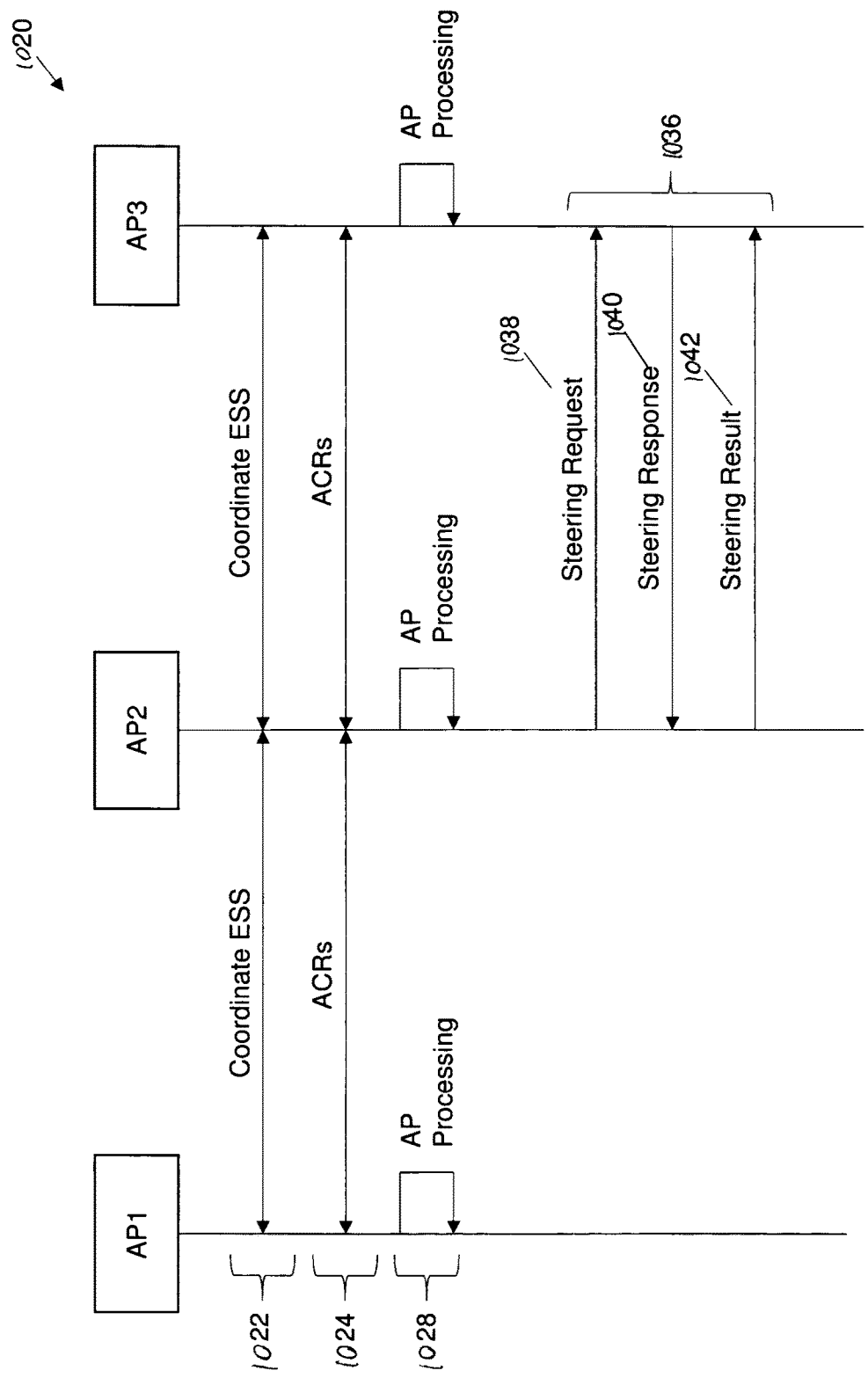
FIG. 10 illustrates a diagram of a method for AP coordination in accordance with one non-limiting aspect of the present invention.

FIG. 10 illustrates a diagram 1020 of a method for AP coordination in accordance with one non-limiting aspect of the present invention. The method generally relates to the APs establishing a coordinator relationship and thereafter utilizing the coordinated relationship to facilitate AP-based steering of clients from one AP to another. The AP coordination may be distributed insofar as the APs may each include capabilities sufficient to facilitate making decisions and requesting APs and/or clients to execute in response thereto. The AP-based decision-making process may be utilized to produce network-based or network-centric steering decisions to optimize a home networking environment without having to employ a wireless local area controller (WLC), or at least without a WLC within the home or as part of or downstream of the GW. Each AP may include a non-transitory computer-readable medium having a plurality of non-transitory instructions stored thereon and executable with a processor to facilitate one or more of the operations contemplated herein. The AP coordination may commence with the APs executing a coordinate ESS process 1022 where the APs may discover each other, such as through a UPnP or other suitable protocol, and thereafter establishing the first LAN 912 or otherwise perform operations sufficient to facilitate exchanging configuration, programming, variables and other information contemplated herein to facilitate steering clients, e.g., the coordinate ESS process 1022 may instigate as new APs are added and/or removed from the home. The information shared between the access points as part of the coordinate ESS process 1022 may include a number of configuration parameters to be utilized when the APs make decisions and other operational executions associated with establishing their respective BSSs within the Wi-Fi network.

An ACR exchange process 1024 may commence after the APs have established the first LAN 912 and communicate the configuration parameters and other information associated with coordinating the activities necessary for supporting wireless services in the contemplated manner. The ACR exchange process 1024 may include the APs each generating an ACR and then communicating that ACR to each of the other APs, i.e., each AP generates one ACR and shares it with each of the other APs. The ACRs may be files, XML schema, documents or other constructs sufficient for communicating information between the APs. The individual ACRs may include metrics sufficient for representing data, measurements, information, etc. associated with operations, capabilities, conditions and other settings as seen or experienced by the APs and the clients. Such metrical information originating from the APs or generated thereat may be considered as AP metrics where the same or different metrical information when originating from the clients or generated thereat may be considered as client metrics. One non-limiting aspect of the present invention contemplates differentiating between AP metrics and client metrics for purposes of facilitating the steering decision processes contemplated herein. The AP metrics may optionally be differentiated from the client metrics at least in so far as the clients are unaware of or lack access to some or all of the AP metrics due to inherent processing limitations and/or lack of visibility to the other APs and/or clients affecting the Wi-Fi network.

The lack of awareness or other limitations of the clients in processing of the AP metrics may allow the APs to make better steering decisions using information otherwise unavailable to the clients. The use of information different than that available to the clients is contemplated to result in improved steering decisions and overall Wi-Fi optimization, especially when addressing the possibility of clients make decisions that are best for them as opposed to those that are best for overall performance of the Wi-Fi network. One non-limiting aspect of the present invention contemplates utilizing AP-based steering decision in cooperation with client-based steering decisions, such as by allowing client-based steering decisions during transmission lulls or other intervals of the clients that may be difficult or impossible to accurately detect with the APs and/or when the nature of the roaming decisions may be unlikely to affect overall network performance, e.g., when network throughput is above a minimum threshold and/or the number of clients attempting to access or part of the Wi-Fi network is insignificant. Using deep packet inspection (DPI) or other suitable assessment capabilities, the APs can decide to steer clients when their network activity is low or is such that a gap in network connectivity would be unlikely to affect the client's application performance, unless the client must be steered before it loses all network connectivity. The APs may DPI, for example, to refrain from steering during a two-way video or phone call unless absolutely necessary but allow steering during one-way video viewing.

One non-limiting aspect of the present invention contemplates improving and maximizing performance by overriding or otherwise preventing the clients from executing any roaming decisions, or least roaming decisions associated with moving from one AP to another AP within the SSID. Reliance on the APs to make a totality of the steering decisions under normal operating conditions or when certain operating conditions are present may be beneficial in assuring certain network performances during identifiable periods of time, which may be beneficial in eliminating complexities associated with accommodating client-based steering decisions while attempting to manage overall network performance or otherwise bring network performance into a desired equilibrium that would otherwise be potentially affected by unanticipated or unexpected client-based decisions to switch APs. Optionally, when the steering/roaming decisions are being performed by the APs in a network-based or network-centric manner, the APs may program or otherwise prevent the clients associated therewith from roaming according to client-based roaming decisions absent a matching steering decision from one of the APs.

One non-limiting aspect of the present invention contemplates sharing the ACRs and/or other information therein as described above. The ACRs in a manner consistent with the incorporated patent application may include both AP metrics and client metrics, e.g., an AP generating one of the ACRs may include AP metrics determined thereat as well as client metrics received from or for clients within its communication range. The incorporated patent application includes a number of variables, metrics, data and other information being exchanged between the APs as well as being received from the clients. The data included therein may be differentiated according to the AP metrics and client metric demarcation noted herein to facilitate its use and application with the present invention. The formatting, transmission and other processes associated with establishing and sharing the ACRs may also be performed in a manner consistent with that described in the incorporated patent application. The ACR exchange process may occur at a high-frequency such that each of the APs essentially have the same information available to make steering decisions based on the same set of factors, i.e., any transmission time differences may be insignificant for purposes of making the steering decisions.

An AP processing operation 1028 may correspond with the APs making the contemplated steering decisions following exchange of the ACRs. One non-limiting aspect of the present invention contemplates each of the APs essentially simultaneously making their own steering decisions based on the ACRs provided from the other APs. This decision-making process may include the APs comparing the AP metrics to the client metrics for purposes of determining whether a client should be steered from one AP to another AP. The individuality of each AP making their own steering decision may be beneficial in avoiding situations where one AP controls or interferes with operations of the another AP in a manner that may harm its operation. To avoid inadvertently disassociating clients or undertaking other actions prior to availability of another AP, the steering decisions may be made in such a manner that the APs presume, even when steering thresholds are surpassed, that clients connected thereto are to remain connected until requested by another AP for steering. An AP (target AP) may request another AP (source AP) to steer a client thereto in response to making a steering decision that one or more clients of the source AP has surpassed a steering decision threshold warranting steering to the target AP. In the event another target AP also determines that a steering decision threshold warranting steering to the another target AP is surpassed, the source AP may then be responsible for deciding which one of the two target APs the client should be steered to, e.g., the client may be steered to the one of APs surpassing the threshold by the greatest amount or to the AP having the lowest MAC address or other arbitrator in the case of the threshold being surpassed equally, i.e., a tie.

Each of the APs within the Wi-Fi network may be considered as a target AP for any client disassociated therefrom such that each of those target APs may be responsible for individually determining whether the clients associated with another AP should be steered thereto. Making the steering decisions may require each AP to perform an iterative process whereby a steering decision is made for each client associated with another AP. In this manner and with respect to the exemplary illustration of FIG. 1, API may be required to make steering decisions for clients A, B, C, D, E, F and G; AP2 may be required to make steering decisions for clients B, C, D, E, F and G; and AP3 may be required to make steering decisions for clients A and C. Client H is shown to be unassociated/unconnected with the APs and may be omitted from the steering decision processing until it associates with one of the APs. The presence of the unassociated client H may influence performance of the Wi-Fi network and information associated therewith may be included as part of the AP metrics and/or the client metrics, e.g., probes and other responses may be communicated from the unassociated client H and utilized to assess its presence and influence or potential influence on the Wi-Fi network. While the present invention contemplates ameliorating some of the decision-making processing by allowing a source AP to omit steering decisions for clients already associated therewith, the source APs may make steering decisions for associated/connected clients for purposes of generating trends, creating historical trends or for other reasons, such as to request another AP to accept one or more of its clients if the Wi-Fi network operates without the presumption that clients are to stay with a connected to AP until steering is requested by another AP.

The AP processing operation 1028 may result in a decision to execute a steering operation whereupon each of the APs deciding to execute such a steering operation may commence a corresponding steering operation. While multiple APs may commence steering operations, FIG. 10 illustrates an exemplary steering operation 1036 between AP2 and AP3, which may be characteristic of the operations associated with facilitating steering operations for any one of the other APs. When AP2 (target) decides that a client should be steered to it, it may send a steering request message 1038 to AP3 (source) that the client is associated with. The source AP (AP3) may then respond with a steering response message 1040 indicating whether or not it will steer the client to the target AP (AP2). To avoid an event where two target APs send a steering request message 1038 for the same client to the source AP, the source AP may be required to wait a minimum of Y*X seconds to receive all steering request messages 1038 from the time it receives the first steering request message 1038, where Y is a multiplier and X is a frequency in which the ACRs are shared. Methods for steering the clients may include 802.11v BSS transition management or by disassociating a client and then Blacklisting (i.e. ignoring Probe Requests/Association Requests from a client) at the source AP. Both the source and target APs may tell each other all the steering methods they support within the shared ACRs so that the source AP can look at the supported steering methods of the target AP and choose the best method supported by both, which may be identified in the steering request message 1038.

The source AP may receive multiple steering request messages 1038 from different APs and assess those requests versus the ACRs to decide which request, or even none, it wants to grant. Optionally data included as part of the ACRs or the configuration parameters may dictate automatic action on the part of the source APs, such as by granting all steering requests, and/or including algorithms or other mechanisms for making decisions on whether to grant a steering request, such as by comparing target AP loading/airtime utilization and target AP viewed RSSI of client to thresholds defined relative to the source AP or other benchmarks. The target AP may be required to always send a steering result message 1042 to the source AP, whether or not the steering is successful. If successful, the target AP may send the steering result message 1042 as soon as the client associates to it with a result code indicating a success. If the client does not associate to the target AP within Z seconds, e.g., 10 seconds, of the target AP receiving the steering response message, the target AP may indicate a failure result code within the steering result message 1042. The result may be used to tell the source AP if the client was successfully steered to the target AP or if the steering failed, which may be beneficial in enabling the source AP to ensure its associated client list is accurate as in some cases a source AP may think the client is still associated, i.e., on its client list, even after the client associates to another AP. The failure of the source AP to recognize a client has associated with another AP or should otherwise be omitted from its client list can be caused by the method in which the client leaves the source AP.

Figure 11:
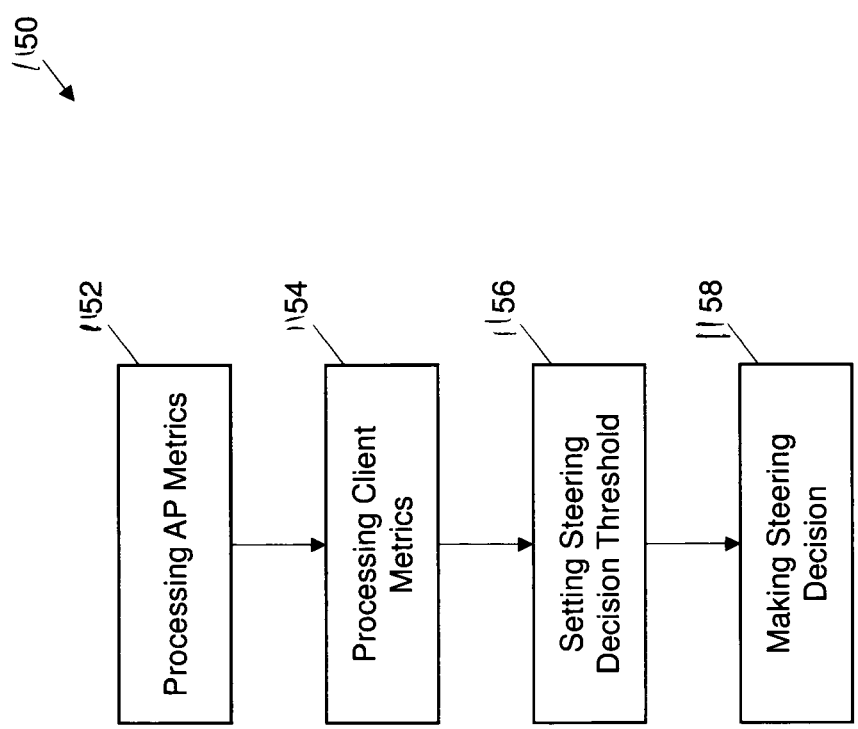
FIG. 11 illustrates a flowchart for a method of facilitating client steering in accordance with one non-limiting aspect of the present invention.

FIG. 11 illustrates a flowchart 1150 for a method of facilitating client steering in accordance with one non-limiting aspect of the present invention. The client steering may correspond with AP-based decision-making processes executed as part of the above-described AP processing operation 1028. The client steering may be individually performed at each of the APs of as a function of the ACR and/or other data available thereto and is described for exemplary non-limiting purposes with respect to being implemented in a manner whereby target APs request source APs to steer clients. The individual decisions being made by each of the APs to execute a steering operation may be facilitated with the non-transitory computer-readable mediums associated with each AP including corresponding instruction sufficient for executing or facilitating execution of the various operations contemplated herein. While the present invention is predominately described with respect to the client steering decisions being made individually at the APs, the present invention fully contemplates its use and application in other environments where a controller or other entity may be tasked with making similar decisions on behalf of the APs, such as when the networking environment is non-Wi-Fi or cellular and/or facilitated with a WLC.

Block 1152 relates to the APs processing AP metrics included within the exchanged ACRs and/or otherwise available thereto. The AP metrics made generally relate to information representative of activities ongoing or capable of occurring at each of the APs. In the exemplary illustration of FIG. 9, AP1 one may process its own AP metrics as a well is that for AP2 and AP3 with the remaining APs similarly processing their own AP metrics as well as that of the other APs. One non-limiting aspect of the present invention contemplates demarcating AP metrics from client metrics based on how the data associated therewith may be used in making the contemplated steering decision, such as in the manner described in more detail below. While additional AP metrics may be utilized without deviating from the scope and contemplation of the present invention, the AP metrics are described herein for exemplary purposes to include a load cost, an airtime utilization (AU) cost and a distance cost whereby a summation of the cost may be used to a final AP cost. The final AP cost may be used to represent performance of one AP versus each of the other APs in a manner sufficient to assess the relative operation of each AP within the context of the multi-AP, Wi-Fi network environment where the activities of one AP may influence the operation of the other APs. The final AP cost, at least in this manner, may be beneficial in providing a benchmark to facilitate comparing the APs to each other.

One non-limiting aspect of the present invention contemplates normalizing the AP metrics relative to an integer scale such that values for each metric may be represented with an integer. One contemplated integer scale corresponds with normalizing the AP metrics to a one byte, unsigned integer value within an integer scale of 0-255. The use of such an integer scale may be beneficial in providing 255 levels of resolution while balancing the data processing and time associated with calculating the integers, i.e., one byte may be relatively easy to calculate and additional levels of resolution beyond 255 may be unlikely to provide sufficient differentiation to warrant use. To compensate for the possibility of one or more of the APs having capabilities of operating more than one radio, e.g., facilitating wireless signaling at 2.4 GHz and 5 GHz, the AP metrics may be related to each of the available or operating radios, or more particularly, the BSSs associated therewith. The load cost, the airtime utilization cost, the distance costs and/or other costs derived from the AP metrics may thereby be represented on a per BSS basis and with a corresponding value within the range of 0-255 so as to facilitate normalizing each value, i.e., each AP metric, to one another.

The load cost derived from the AP metrics may be expressed based on an agreed-upon or other maximum number of clients that a BSS can support, which for example may correspond with a 2.4 GHz BSS supporting a maximum of 16 clients and a 5.0 GHz BSS supporting a maximum of 32 clients. The load cost may be calculated as follows:

for 2.4 Ghz band–(sqrt(2)^x)–1, $x$=number of clients connected for 5.0 Ghz band–(4th root(2)^x)–1, $x$=number of clients connected The number of clients connected corresponds with the number of clients connected to a particular BSS of an AP such that the corresponding load cost represents a value for each BSS based on the number of connected clients. The illustrated formulas indicating the 2.4 GHz utilizing a square root and the 5.0 GHz utilizing a fourth square root to address throughput differences between 2.4 GHz and 5.0 GHz in a manner believed beneficial in relating AP loading when some APs may not include multiple radios or the capabilities to operate across multiple frequency bands.

The airtime utilization cost derived from the AP metrics may be expressed based on a percentage of airtime utilized over some agreed upon interval of time, which may be specified with AP coordination variables or otherwise established between the APs. The airtime utilization cost may, like the load cost, may be calculated on a per BSS basis as follows:

(2^x)–1, $x$=percentage of airtime utilization over time interval/10

One non-limiting aspect of the present invention contemplates operational constraints and other limitations resulting in the BSSs essentially maximizing airtime usage when airtime utilization is at 80% such that the above formula may generate an airtime utilization (AU) cost of 0 when the airtime utilization is 0%, e.g., AU cost equals 2^(0/10)–1, and an airtime utilization cost of 255 when the airtime utilization is 80%, e.g., AU cost equals 2^(80/10)–1.

The distance costs derived from the AP metrics may be expressed based on how far away the corresponding BSS is from the GW and calculated as follows:

(2^x)–1, $x$=distance.

One non-limiting aspect of the present invention contemplates selecting the distance to represent a number of hops from the GW of the corresponding BSS with a maximum number of hops being set to 8 such that the distance is represented with an integer between 0-8, e.g., 0 when the BSS is part of the GW, 1 when the BSS is the first AP from the GW (e.g., AP2) and 2 when the BSS is the second AP from the GW (e.g., AP3), etc. until a maximum value of 8. The contemplated use of integers between 0-8 is believed to be beneficial in addressing network topologies to represent costs associated with communicating data over the first LAN 912 based on travel distance to the GW. One non-limiting aspect of the present invention contemplates optionally weighting the distance cost based on other factors in addition to or in place of the number of hops from a GW to generate a value also representative of network topology and/or distance from a GW. These additional options may include: employing bandwidth, delay, wired and/or wireless backhaul connectivity to weight or adjust distance values to compensate for variations between hops and distance away from the gateway router. The number of hops to the gateway, throughput and delay of the connections may affect the distance cost analysis, e.g., wireless AP to AP connection could be 4 and wired connection can be 2 such that backhaul routing cost to send data between two APs maybe inversely proportional to the throughput between the APs. Optionally, if a link metric between all APs is known, those link metrics may be utilized as an alternative value for the distance x in the above calculation of the BSS distance cost, e.g. between AP1 and AP2 the metric may represent throughput (e.g., T12) such that the distance cost over this link may be 1/T12, which may be similarly summed or assessed for each other link between the AP and GW to generate the x value.

The final AP cost may be similarly determined on a per BSS basis as a summation of the corresponding load cost, airtime utilization cost and distance cost, optionally with those cost values being weighted according to selectable weightages to affect the influence thereof on the final AP cost calculation. The final AP cost may be calculated as follows:

((BSS load cost/weightage($a$))+(BSS airtime utilization cost/weightage($b$))+(BSS distance cost/weightage($c$)))/number of metrics The foregoing demonstrates one non-limiting manner for calculating a final AP cost for each BSS with the individual values (metrics) being weighted prior to their summation. The weightages (e.g., a, b, c) may be selected on a per-BSS basis such that the weightages applied to one BSS may be different than those applied to another BSS, which may be beneficial in compensating for some BSSs having wide differences in operating capabilities, and/or the weightages may be applied equally to each of the individual cost metrics, i.e., each BSS being compared may have the corresponding metrics weighed with the same weightage to maintain consistency. The summation of the cost metrics may be divided by the total number of metrics being summed to keep the summation within the integer scale of 0-255 such that the number of metrics may change depending on whether more or less or different metrics are used than the exemplarily illustrated load, airtime utilization and distance costs.

One non-limiting aspect of the present invention contemplates selecting the weightages (e.g., a, b, c) for each of the integer values being weighted from a listing of weightages associated with a plurality of network performances. The network performances may relate to particular operating characteristics of the Wi-Fi network, such as to prioritize performance for video streaming over burst data transmissions for IoT devices. The weightages may be tabulated within a listing that cross-references the weightages to be used with each of the AP metrics for the corresponding network performance. The APs may coordinate to select the one of the plurality of network performances to be used in setting the weightages, which may optionally change over time or in response to historical behavior/needs of the Wi-Fi network. Testing of the present invention indicates empirically that a weightage value of 2 for the load cost, a weightage value of 6 for the distance cost and a weightage of 2 for the airtime utilization cost may maximize overall network performance for the given set of AP metrics.

Block 1154 relates to each of the APs processing client metrics included within the exchanged ACRs and/or otherwise available thereto. The client metrics may be processed by the APs on a per client basis to relate a relative capability/cost for each client to communicate with each of the APs. One non-limiting aspect of the present invention contemplates the client metrics corresponding with a band cost and a signal-to-noise ratio (SNR) cost. The band cost and the SNR cost may be utilized to generate the final client cost normalized in the above-described manner with respect to the integer scale of 0-255 to provide a representable relationship to the final AP cost sufficient to facilitate making steering decisions.

The client band cost derived from the client metrics may be calculated to generate a factor for representing capabilities of each client to communicate with different radios, e.g., whether each client supports one or both of 2.4 GHz and 5.0 GHz communications. The client capability to communicate with different radios may then be related to one or more radios the client band associated with a particular BSS to provide an assessment of the client capabilities to communicate with that BSS. The client band cost may be calculated as follows:

If BSS band is 2.4 Ghz:
 client supports only IEEE 802.11b/g: scale factor=¼
 client supports IEEE 802.11n: scale factor=½
 client supports IEEE 802.11ac: scale factor=1
If BSS band is 5.0 Ghz:
 client supports only IEEE 802.11b/g: scale factor=1
 client supports IEEE 802.11n: scale factor=½
 client supports IEEE 802.11ac: scale factor=¼

The scale factor, e.g., 1, ½ and ¼, used to represent the client band cost may be employed as described below to facilitate calculating the final client cost, which for exemplary purposes corresponds with determining the client cost as a scale factor instead of an integer within the 0-255 scale. The above formula notes the use of IEEE 802.11b/g, 802.11n and 802.11ac to represent client devices respectively having capabilities limited to 2.4 GHz communications (802.11b/g), capabilities for both 2.4 GHz and 5.0 GHz communications (802.11n) and capabilities limited to 5.0 GHz communications (802.11ac). The use of the IEEE designation is shown for exemplary non-limiting purposes as the present invention fully contemplates using other, such as IEEE 802.11ad for 60 GHz or other references suitable to demarcating available bandwidth capabilities of the clients.

The client signal-to-noise (SNR) cost derived from the client metrics may be generated to calculate an integer value sufficient for representing within the 0-255 scale how well each client can communicate with each BSS of the APs. The client SNR cost may be calculated as follows:

client SNR cost=−(RSSI+15)*3

The RSSI may correspond with a relative signal strength indicator (RSSI) utilized to represent relative signal strength between each client and each of the BSSs. A range for maximum and minimum RSSI values that a client may have may be set to [−15, −100] with −15 indicating the client to be very close and −100 indicating the client to be at a maximum distance. Optionally, actual SNR values may be normalized and utilized in place of the RSSI.

The final client cost derived from the client metrics may be calculated on a per BSS basis as follows:

client cost=client SNR cost*client band cost

The contemplated final client cost may be beneficial in providing an integer value within the range of 0-255 sufficient for balancing the communication capabilities of each client relative to each BSS, e.g., whether the client supports 2.4 GHz and/or 5.0 GHz communications, relative to signaling distance of the client to the corresponding BSS. While the use of additional client metrics in facilitating tabulation of the final client cost is foreseen, one non-limiting aspect of the present invention contemplates demarcating the AP metrics from the client metrics according to their use in calculating the final AP cost and the final client cost, i.e., the same metrics would not be used in both of the final AP cost in the final client cost, which may be beneficial in maximizing the integrity and independence of the cost calculations, particularly with respect to apportioning the influences to particular behaviors of the APs and the clients.

Block 1156 relates to the APs setting a steering decision threshold to be used in making decisions as to whether a client steering operation should be instigated. One non-limiting aspect of the present invention contemplates the APs coordinating to set the steering decision threshold in a manner sufficient to assess whether a client currently connected to one BSS should be steered to another BSS. One contemplated strategy for setting the steering decision threshold based on the AP metrics may be as follows:

steering threshold=(final BSS cost for source AP)−(final BSS cost for target AP)

The steering threshold may be calculated on a per BSS basis by each of the APs with each AP iteratively performing the calculations as the source AP relative to each of the other APs being target APs. Optionally to limit hysteresis or clients switching to frequently, the difference in the final cost between two APs may need to be at least greater than greater than a predefined hysteresis value (e.g., 20).

Block 1158 relates to the APs making steering decision based on whether individual clients exceed the steering threshold associated therewith. The steering threshold may be based on a client switching from a source AP to a target AP such that the corresponding steering decision may be based on whether a difference between the client's performance at the BSS of the source AP and that same client's performance at the BSS of the target AP is sufficient to warrant executing a steering operation to steer the client from the source AP to the target AP. One contemplated strategy for making the steering decision based on the client metrics may be as follows:

steer if ((final client cost for source BSS)−(final client cost for target BSS))>(maximum of (steering decision threshold and hysteresis value))

A greater steering threshold occurs when the AP metrics indicate the BSS of the target AP to be more loaded than the source AP and/or if the BSS of the target AP has a greater airtime utilization or distance cost such that the client's performance, if switched to the target AP, must be sufficient to justify the corresponding steering operation. The steering threshold cost, or in other words the difference between client performance at one BSS in comparison to another BSS, can be adjusted up or down depending on desired influences, e.g., rather than using the noted threshold a weightage may be applied to increase or decrease the corresponding value. The weightage for example may decrease the threshold when it may be desirable to reduce the influence of BSS cost versus client cost in the weightage may be increased to increase the influence of BSS cost versus client cost. The plurality of network parameters utilized to facilitate selection of the way the weightages optional utilize when regulating the final BSS cost may include values for selecting weightages to be applied to the steering decision threshold.

Coordinate AP Channel Assignment/Mobile Client Management

The present systems and methods are further useful to optimize channel assignment of co-located wireless APs using two or more wireless interfaces per AP, and thereby more effectively detect and manage nearby wireless clients, while avoiding co-channel interference and also maximizing spectrum utilization. As described above, conventional solutions rely on the client to actively send periodic probe requests to nearby APs, which is problematic when the probe requests are sent infrequently and/or on other channels. According to the present embodiments, a plurality of wireless interfaces are utilized for a single AP, thereby overcoming the conventional problems by assigning more than one channel per AP.

Figure 12:
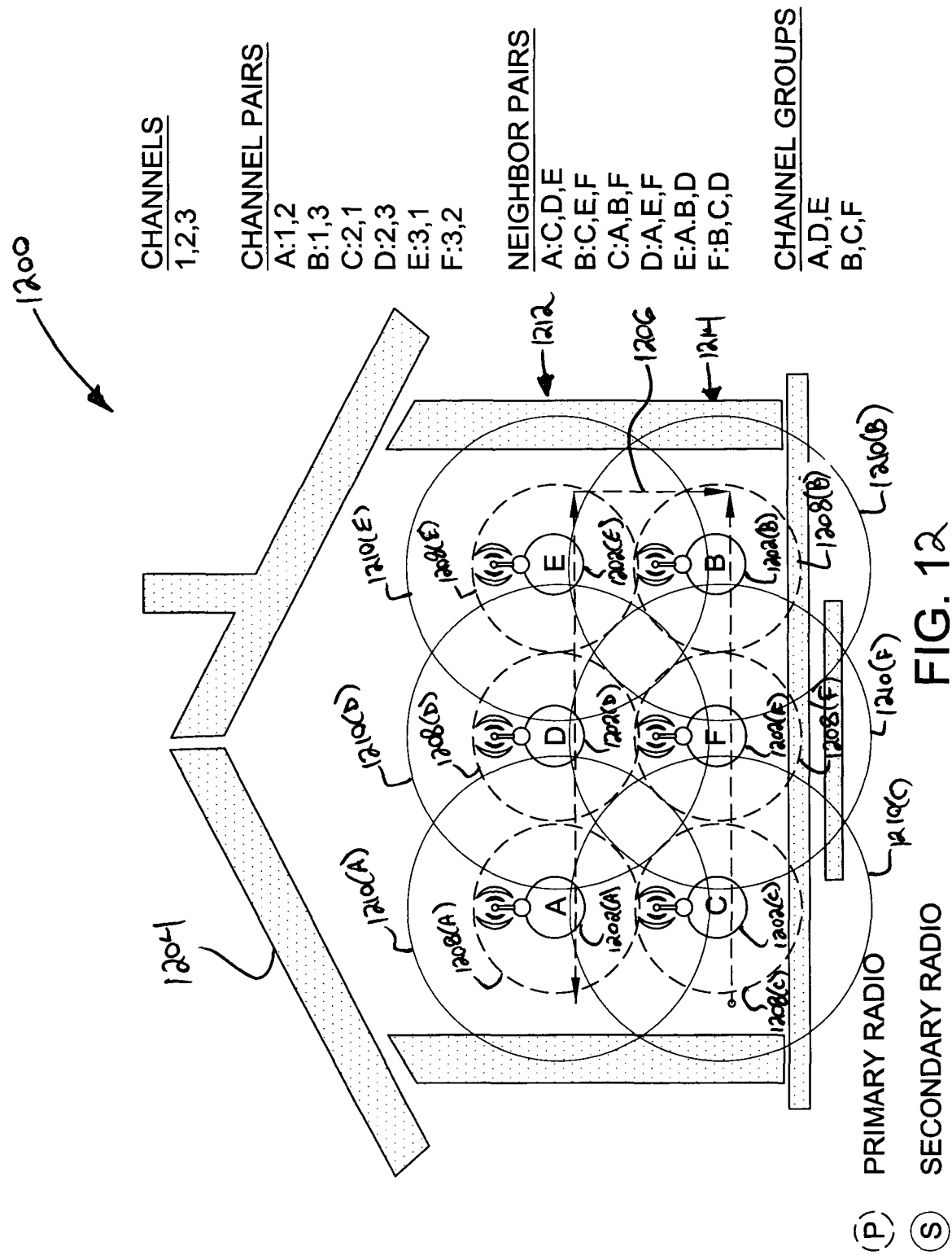
FIG. 12 is a schematic illustration of an exemplary multi-AP system implementing multiple interfaces for a single AP, in an embodiment.

FIG. 12 is a schematic illustration of an exemplary multi-AP system 1200 implementing multiple interfaces for a single AP 1202 of a plurality of co-located APs 1202(A)-1202(F) (e.g., AP$_A$-AP$_F$, in the example illustrated in FIG. 12), distributed throughout a physical location environment 1204. Physical location environment 1204 may, for example, represent a customer premises or home environment. A person of ordinary skill in the art will understand though, that the principles of the embodiments described herein are not limited to home environments, and are applicable to many other environments utilizing multiple APs.

In an exemplary embodiment, physical location environment 1204 may be similar to environment 400, FIG. 4, and includes a wireless backhaul 1206 between, and connecting, the plurality of APs 1202. For simplicity of explanation, routers, modems, gateways, and wired backhauls are not shown in FIG. 12. System 1200 thus depicts any exemplary coordination scheme of for respective APs 1202 of various wireless clients having a plurality of connection/communication path options within environment 1204.

In exemplary operation of system 1200, a primary radio channel 1208 and a secondary radio channel 1210 are assigned to each AP 1202. Channel assignment may, for example, be managed or controlled by a central processor (not shown) of environment 1204, which may be included in one of APs 1202, a router, a modem, or a gateway. In at least one embodiment, channel assignment is managed externally to environment 1204 (e.g., by a modem termination system (MTS, not shown) in communication with one or more APs 1202 directly, or indirectly through a router, modem, or gateway within environment 1204.

In the exemplary embodiment, an individual assigned primary radio channel 1208 does not overlap with a primary channel 1208 assigned to an adjacent AP 1202. In the example depicted in FIG. 12, this non-overlap effect can be seen with respect to at least primary radio channel 1208(D) assigned to AP 1202(D), which does not overlap with primary radio channels 1208(A) or 1208(E), assigned to APs 1202(A) and 1202(E), respectively. Further to the exemplary embodiment, an individual secondary radio channel 1210 is also assigned to each AP 1202. Differently from the respective primary radio channels 1208, each of secondary radio channels 1210 is shared with at least one primary channel 1208 of an adjacent AP 1202.

More specifically, for the example illustrated in FIG. 12, system 1200 is depicted to coordinate AP channel assignment for three channels (i.e., CH1, CH2, and CH3) utilized for six APs 1202(A)-1202(F). Three channels and six APs are used to illustrate the concept in this example for ease of explanation, and should not be considered in a limiting sense. The person of ordinary skill in the art will understand that the principles of this embodiment may be more generally applicable to multi-AP systems utilizing a plurality of channels.

In further exemplary operation of system 1200, two of the three channels are assigned to each respective AP 1202 as a primary/secondary channel pair corresponding to [1208$_N$, 1210$_M$], where N and M are different from one another, and represent the channel number being assigned to the particular AP 1202. Thus, in the example depicted in FIG. 12, for AP 1202(A), the channel pair [1208(A), 1210(A)]=[CH1, CH2]. In a similar manner, [1208(B), 1210(B)]=[CH1, CH3], [1208(C), 1210(C)]=[CH2, CH1], [1208(D), 1210(D)]=[CH2, CH3], [1208(E), 1210(E)]=[CH3, CH1], and [1208(F), 1210(F)]=[CH3, CH2].

Optionally, channel assignment may be managed in further consideration of one or more channel groups of APs 1202. For example, as illustrated in FIG. 12, a first channel group 1212 includes APs 1202(A), 1202(D), 1202(E) (e.g., all APs on a single floor/region of a multiple-floor/region dwelling), and a second channel group 1214 includes APs 1202(B), 1202(C), 1202(F). In an exemplary embodiment, channel assignment is further performed in consideration of pairs of neighboring/adjacent APs 1202. For example, AP 1202(A) is illustrated to be capable of forming a neighbor pair with each of APs 1202(C), 1202(D), and 1202(E). In this particular instance, AP 1202(C) is considered a "neighbor" because secondary radio channel 1210(C) of AP 1202(C) overlaps with AP 1202(A), whereas although secondary radio channel 1210(E) of AP 1202(E) does not overlap with AP 1202(A), AP 1202(E) is considered a neighbor for being in the same channel group (i.e., first channel group 1212) with AP 1202(A). Similarly, AP 1202(D) is considered a neighbor to AP 1202(A) under either consideration.

Accordingly, given set of possible channels (i.e., three channels in this example), system 1200 is advantageously configured to assign two channels of the set as primary and secondary channels (e.g., 1208, 1210), respectively, for each of a plurality of APs (e.g., APs 1202) within a basic service area (e.g., environment 1204). In the exemplary embodiment, the assigned primary channel does not overlap with the primary channel of other APs within the same service area.

In exemplary operation, the channel assignment scheme of system 1200 may be configured to favor the primary channel (e.g., 1208) when associating new wireless clients. In contrast, the assignment scheme assigns the secondary channel (e.g., 1210) to be the same as the primary channel of at least one adjacent AP with which the secondary channel overlaps within the same service area. Accordingly, the secondary channel may serve primarily to detect nearby wireless clients, and/or to monitor movement into, within, or out of the particular service area. By providing an AP with the capability of sharing at least one channel with an adjacent AP, each AP is able to advantageously realize at least two points of reference (i.e., primary and secondary) for both of the detection and management functionalities.

In some embodiments, the channel assignment scheme of system 1200 operates as an alternative to the routing calculus described above with respect to FIGS. 4 and 5. In other embodiments, the least-cost routing calculus of FIGS. 4 and 5 may be performed in a supplemental fashion, in coordination with the channel assignment scheme of system 1200 in a multi-AP environment, but consistently with the respective assignment of channels, channel pairs, channel groups, and neighbor pairs of system 1200, where applicable. The exemplary channel assignment the embodiments described herein may be, for example, of particular benefit to wireless AP vendors having products intended for deployment within dense or congested wireless environments. Management and control of such wireless products according to the present systems and methods would significantly increase the value and efficiency of the particular wireless product.

Exemplary embodiments of systems and methods for coordinated access point channel assignment are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, such is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including the make and use of devices or systems, and performance of incorporated methods. The patentable scope of the disclosure is defined by the claims, and may include other examples that occur to skilled artisans. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A multiple access point system, comprising:
    a wireless network including a first channel and a second channel;
    a first access point adjacent a second access point co-located within a single physical location environment;
    a wireless backhaul connecting the first and second access points to the wireless network; and
    a processor configured to (i) assign the first channel as a primary channel of the first access point and the second channel as a primary channel of the second access point, (ii) assign the first channel as a secondary channel of the second access point, and (iii) assign the second channel as a secondary channel of the second access point,
    wherein the processor is configured to assign the first and second channels considering that:
        the primary channel of the first access point does not overlap with the primary channel of the second access point;
        the secondary channel of the second access point overlaps with the first access point; and
        the secondary channel of the first access point is shared with the primary channel of the adjacent second access point,
    wherein the processor further comprises a component of a modem termination system external to the single physical location environment, wherein at least one of the first access point and the second access point are in operable communication with the modem termination system.

2. The system of claim 1, wherein the processor comprises a component of at least one of the first access point and the second access point.

3. The system of claim 1, wherein the processor comprises a component of at least one of a router, a modem, and a gateway located at the single physical location environment.

4. The system of claim 1, wherein the at least one of the first access point and the second access point is configured to communicate directly with the modem termination system.

5. The system of claim 1, wherein the at least one of the first access point and the second access point is configured to communicate indirectly with the modem termination system through at least one of a router, a modem, and a gateway located at the single physical location environment.

6. The system of claim 1, further comprising a third access point and a fourth access point co-located within the single physical location environment and connected to the wireless network through the wireless backhaul, wherein the third access point is adjacent the first access point, and wherein the fourth access point is adjacent the second access point.

7. The system of claim 6, wherein the processor is further configured to assign the first access point and the third access point into a first channel group, and the second access point and the fourth access point into a second channel group.

8. The system of claim 7, wherein the processor is further configured to assign (i) the first channel group to a first physical region of the single physical location environment, and (ii) the second channel group to a second physical region of the single physical location environment different from the first physical region.

9. The system of claim 8, wherein the single physical location environment is a multiple-floor dwelling, and wherein the first and second physical regions are separate floors of the multiple-floor dwelling.

10. The system of claim 7, wherein the third access point includes a third primary channel and a third secondary channel, wherein the fourth access point includes a fourth primary channel and a fourth secondary channel, wherein the third primary channel does not overlap with the primary channel of the first access point, and wherein the fourth primary channel does not overlap with the primary channel of the second access point.

11. The system of claim 10, wherein the third secondary channel overlaps with the first access point, wherein the wireless network further includes a third channel, and wherein the processor is further configured to assign the second channel as the third primary channel and the third channel as the third secondary channel.

12. The system of claim 11, wherein the third secondary channel does not overlap with the second access point.

13. The system of claim 12, wherein the third secondary channel overlaps with the fourth access point.

14. The system of claim 13, wherein the processor is further configured to assign the third channel as the fourth primary channel and the second channel as the fourth secondary channel.

15. The system of claim 14, further comprising a fifth access point and a sixth access point co-located within the single physical location environment and connected to the wireless network through the wireless backhaul, wherein the fifth access point is adjacent the third access point, and wherein the sixth access point is adjacent the fourth access point.

16. The system of claim 15, wherein the processor is further configured to assign the fifth access point into the first channel group, and the sixth access point into the second channel group.

17. The system of claim 16, wherein the fifth access point includes a fifth primary channel and a fifth secondary channel, wherein the sixth access point includes a sixth primary channel and a sixth secondary channel, wherein the fifth primary channel does not overlap with the primary channel of the third access point, and wherein the sixth primary channel does not overlap with the primary channel of the fourth access point.

18. The system of claim 17, wherein the fifth secondary channel overlaps with the sixth access point.

19. The system of claim 18, wherein the processor is further configured to assign (i) the third channel as the fifth primary channel, (ii) the first channel as the fifth secondary channel, (iii) the first channel as the sixth primary channel, (ii) the third channel as the sixth secondary channel.

* * * * *